(12) United States Patent
Cunliffe

(10) Patent No.: US 10,550,932 B2
(45) Date of Patent: Feb. 4, 2020

(54) SEQUENTIAL SHIFT GEARBOX CONVERTER ASSEMBLY

(71) Applicant: Simon Christopher Cunliffe, Brisbane (AU)

(72) Inventor: Simon Christopher Cunliffe, Brisbane (AU)

( * ) Notice: Subject to any disclaimer, the term of this patent is extended or adjusted under 35 U.S.C. 154(b) by 362 days.

(21) Appl. No.: 15/303,211

(22) PCT Filed: Apr. 9, 2015

(86) PCT No.: PCT/AU2015/050160
§ 371 (c)(1),
(2) Date: Oct. 10, 2016

(87) PCT Pub. No.: WO2015/154145
PCT Pub. Date: Oct. 15, 2015

(65) Prior Publication Data
US 2017/0030459 A1    Feb. 2, 2017

(30) Foreign Application Priority Data

Apr. 9, 2014   (AU) .............................. 2014901303

(51) Int. Cl.
*F16H 59/04*   (2006.01)
*F16H 61/26*   (2006.01)
*F16H 59/02*   (2006.01)

(52) U.S. Cl.
CPC ............. *F16H 59/04* (2013.01); *F16H 61/26* (2013.01); *F16H 2059/026* (2013.01); *F16H 2059/0295* (2013.01); *F16H 2059/047* (2013.01)

(58) Field of Classification Search
CPC ................... F16H 2061/242; F16H 2059/0239
See application file for complete search history.

(56) References Cited

U.S. PATENT DOCUMENTS 3,636,793 A * 1/1972 Bieber .................. B60K 20/02
                                                   74/473.1
4,028,959 A * 6/1977 Long ...................... F16H 59/04
                                                   74/473.23

(Continued)

*Primary Examiner* — William Kelleher
*Assistant Examiner* — Gregory T Prather
(74) *Attorney, Agent, or Firm* — Lane Powell PC

(57) ABSTRACT

A sequential shift gearbox converter assembly to convert a H-pattern gearbox to a sequentially shifted gearbox, the converter assembly including a shifting lever mounted relative to a converter housing, a drive arm mounted for movement driven by the shifting lever, a first shaped cam for rotation driven by the drive arm, a first gear for movement caused by movement of the first shaped cam, a second gear for movement caused by movement of the first gear, a second shaped cam mounted for movement when the second gear is moved, a reciprocating shifter member moved according to movement of the second shaped cam, a reciprocating shifter member moved according to movement of the second shaped cam to in turn move an elongate shifter rod of a gearbox transversely and a shifter rod rotating arm having a first portion biased into contact with the first shaped cam and a second portion to rotate the elongate shifter rod when urged to by the shape of the first cam during rotation thereof.

15 Claims, 28 Drawing Sheets

(56) References Cited

U.S. PATENT DOCUMENTS

| | | | | | |
|---|---|---|---|---|---|
| 4,546,665 | A | * | 10/1985 | Bieber | B60K 20/04 74/473.33 |
| 4,756,205 | A | * | 7/1988 | Dickinson | F16H 59/04 74/471 XY |
| 5,269,204 | A | * | 12/1993 | Moroto | F16H 61/0206 477/131 |
| 5,454,764 | A | * | 10/1995 | Koenig | F15B 13/06 475/131 |
| 5,552,761 | A | * | 9/1996 | Kazyaka | F16H 63/42 116/28.1 |
| 6,820,515 | B2 | * | 11/2004 | Ikeya | F16H 59/04 74/473.1 |
| 2007/0157757 | A1 | * | 7/2007 | Trevino | F16H 59/02 74/519 |
| 2010/0126295 | A1 | * | 5/2010 | Akkerman | F16H 59/042 74/473.36 |

\* cited by examiner

SEQUENTIAL SHIFT GEARBOX CONVERTER ASSEMBLY

CROSS-REFERENCE TO RELATED APPLICATIONS

This application is a 35 USC § 371 filing of International Application No. PCT/AU2015/050160, filed Apr. 9, 2015 and entitled A SEQUENTIAL SHIFT GEARBOX CONVERTER ASSEMBLY, which claims the benefit of Australian Provisional Patent Application Serial No. 20140901303, filed Apr. 9, 2014, entitled A SEQUENTIAL SHIFT GEARBOX CONVERTER ASSEMBLY, which is herein incorporated by reference in its entirety.

TECHNICAL FIELD

The present invention relates generally to gearboxes for vehicles and in particular to a sequential shift gearbox converter assembly to convert an H-pattern gearbox to a sequentially shifted gearbox.

BACKGROUND ART

An H-pattern manual transmission uses an H type movement of the gear selection lever while a sequential transmission works with upward and downward movement of the lever, to shift between the gears.

Sequential gearboxes are simple. If a user wishes to shift from second to third gear, this can be achieved by a simple upward push of the gear lever. In a manual transmission, a user is required to move the lever up, around and up to complete the same task.

Sequential gearboxes have consistent shift patterns. If a user wishes to shift gears up or down, they would use the same movement. A user does not have to think about the movement pattern to perform the action as is the case with H-pattern manual transmission systems.

With sequential gears, hand placement and movement are always the same. In case of an H-type manual transmission, a user always has to think about the location of gear lever with reference to the current gear and desired gear. A sequential transmission shifts gears by upward or downward movement. Response times are relatively less with sequential transmissions.

There are fewer missed lever movements with a sequential gearbox. A user cannot accidently shift the wrong gear and damage the transmission. If a user were using a manual H type gearbox, they can accidently shift up when they wanted to shift down. This cannot happen with sequential gearboxes.

Sequential shifters are known. U.S. Pat. No. 6,308,797 relates to a shifter for a motorcycle transmission. This patent depicts the common barrel cam used in motorcycles and deals with solving the problem of positively stopping the barrel cam in incremental gearshift positions. This ratcheting mechanism does not positively control the barrel cam throughout movement, but does include a stop at end of incremental movement. If for instance the cam is partially moved, due to accidental movement of the motorcycle rider's foot, the ratchet mechanism will disengage the cam in an intermediate position. In addition, if the rider's foot motion is not uniform and slows down toward the end of shift motion, the cam can move inertially past a shift position. In addition, if the gear teeth or engagement dogs in the transmission do not smoothly engage; actuation force increases rapidly, resulting in stored energy within the mechanism, the rapid release of stored energy can cause the cam to spring away from the ratchet assembly, and result in uncontrolled cam movement.

The ratcheting system patented in U.S. Pat. No. 6,843,149 B2 closely resembles and has the same inherent limitations as the ratchet system used in U.S. Pat. No. 6,308,797. U.S. Pat. No. 6,843,149 B2 relates to a sequential shifter for an automobile transmission. This patent depicts a mechanism for mounting on a transmission to provide sequential gear selection by using: "One or more disk cams arranged to be turned by a rotary motion and a follower for each cam adapted to produce to and fro movement capable of linkage to a gear train selector." In this embodiment, separate cam active surfaces are required for each follower. In this patent, the ratchet mechanism does not positively control the cam during movement.

These mechanisms are sequential and are not intended to adapt an H-pattern transmission to a sequential shifted transmission. Adapting an H-pattern transmission to a sequential shifted transmission means that the advantages of a sequential shifted transmission can be gained in a vehicle that may have an H-pattern transmission without requiring replacement of the entire transmission.

It will be clearly understood that, if a prior art publication is referred to herein, this reference does not constitute an admission that the publication forms part of the common general knowledge in the art in Australia or in any other country.

SUMMARY OF INVENTION

The present invention is directed to a sequential shift gearbox converter assembly, which may at least partially overcome at least one of the abovementioned disadvantages or provide the consumer with a useful or commercial choice.

With the foregoing in view, the present invention in one form, resides broadly in a sequential shift gearbox converter assembly to convert a H-pattern gearbox to a sequentially shifted gearbox, the converter assembly including:

a) A shifting lever mounted relative to a converter housing;
b) A drive arm mounted for movement driven by the shifting lever;
c) A first shaped cam for rotation driven by the drive arm;
d) A first gear for movement caused by movement of the first shaped cam;
e) A second gear for movement caused by movement of the first gear;
f) A second shaped cam mounted for movement when the second gear is moved;
g) a reciprocating shifter member moved according to movement of the second shaped cam to in turn move an elongate shifter rod of a gearbox transversely; and
h) a shifter rod rotating arm having a first portion biased into contact with the first shaped cam and a second portion to rotate the elongate shifter rod when urged to by the shape of the first cam during rotation thereof.

The present invention includes a housing allowing the assembly to be mounted relative to a vehicle gearbox or chassis. The housing will typically also enclose the components of the assembly in order to protect them. The shifting mechanism is typically provided relative to the housing and the elongate shifter rod is normally provided at least partially within a lower gearbox housing relative to which the housing of the invention is mounted.

The housing may preferably formed from a pair of housing portions attached to one another in order to form a substantially enclosed housing. Normally, elongate fasteners extend through one of the housing portions and at least partially into but preferably not through the other of the housing portions. In this configuration, each of the housing portions will typically have a clamshell configuration. Elongate fasteners such as screws or bolts are preferred.

The housing will typically be mounted to an upper end the housing of the gearbox.

The upper housing portions typically attach to one another about a spine plate. The spine plate will typically be located approximately centrally across the width of the housing and will normally mount the components of the assembly relative thereto, and within the housing. Preferably, the spine plate will be sandwiched between respective clamshell parts of the housing portions. The fasteners used to attach the clamshell housing portions to one another will typically extend through openings provided in the spine plate as well and may be provided with annular bosses to positively located the spine plate relative to the housing portions. The shape of the spine plate typically matches at least a portion of the shape of the housing and preferably, an external shape of the spine plate will correspond to be peripheral shape of the housing.

Normally, the components of the assembly mounted on either side of the spine plate. Some of the components are mounted through the spine plate whereas other components are mounted on one lateral side of the spine plate only. Components may be mounted relative to the spine plate and also the housing portion on one side of the spine plate. Normally, portions mounted relative to the spine plate will be mounted about a boss to allow rotation of the components and translation of the components where required.

The spine plate will preferably have a pair of spaced apart extension arms extending in the same plane as the spine plate and between which one end of the shifting lever is located. The extension arms will preferably act as stops to limit the movement of the lower portion of the shifting lever during shifting. Normally, there will be a forward extension arm in front of the lever and a rear extension arm behind the lower end of the lever.

The gearbox converter assembly of the present invention is typically mounted relative to a vehicle gearbox or chassis in which the gear shift lever of an H-pattern gearbox has been removed. Typically, when this occurs, the shifter rod(s) that link the gearshift of the H pattern gearbox to the moving portions of the gearbox will remain and the converter assembly of the present invention engages with the existing shifter rod(s). Preferably, the convertor of the present invention is located relative to the shifter rod(s) in order to mover the shifter rod(s) as required.

The shifting lever will typically extend upwardly from the housing of the converter assembly to replace the gearshift lever of the H-pattern gearbox. The shifting lever of the present invention will typically be elongate. The shifting lever may have any shape but preferably, a knob or similar gripping assembly will be provided at an upper end of the shifting lever.

The shifting lever will preferably be mounted pivotally at or preferably adjacent a lower end of the shifting lever which is located within the converter housing. The shifting lever is preferably mounted towards the lower end, allowing the lower end which is spaced from the mounting position, to create leverage at the lower end.

The shifting lever of the present invention is preferably biased into a central position and is then typically movable forwardly and rearwardly against the bias, which returns the shifting lever to a "home" position. The lower end of the shifting lever is preferably mounted relative to the spine plate as explained above.

The shifting lever of the preferred embodiment extends down into the housing, with the lower end located within the housing and preferably mounted to a connector arm at or towards the lower end of shifting lever. The connector arm is typically located on one lateral side of the lower end of the shifting lever. The connector arm is provided in order to connect the shifting lever to the drive arm of the converter assembly of the present invention in order to move the drive arm when the shifting lever is moved. Typically the drive arm is moved in a direction which is opposite to the direction in which the shifting lever is moved. For example, if the shifting lever is pushed forward, the drive arm will typically move rearwardly and vice versa. The connector arm may be directly fixed to the shifting lever or not, but is preferably directly fixed to the shifting lever at the pivot mount of the shifting lever as well as to the lower end of the shifting lever.

The connector arm may have any shape but is typically elongate. The connector arm is normally completely located within the housing of the converter assembly. The connector arm is preferably larger in dimension at an upper end and narrows as the connector arm extends downwardly. The connector arm can be made from any material but will preferably be metal.

The connector arm will preferably be mounted on the same side of the spine plate as the first gear, second gear and particularly, the first shaped cam of the converter assembly of the present invention. The connector arm will preferably have a lower end which is mounted pivotally to or relative to the drive arm of the converter assembly. Preferably, the lower end is mounted to the drive arm about a pivot pin as this will typically allow the forward and reverse movement of the shifting lever to be transferred to a forward and reverse movement of the drive arm albeit in the opposite direction to the movement of the shifting lever.

The converter assembly of the present invention includes a drive arm mounted for movement driven by the shifting lever. The drive arm can have any shape but is preferably an arcuate shape with a shallow curve only. Given that the drive arm will move in a reciprocating direction forwardly and rearwardly, the shallow curve of the preferred arcuate drive arm will provide strength but will also allow minimal space to be used. The drive arm will preferably be elongate. The drive arm will typically be substantially planar when viewed from above and will preferably have the appearance of a shaped plate.

One end of the drive arm will preferably be connected to or relative to the connector arm as explained above. An opposite end of the drive arm will typically be provided with an engagement configuration thereon in order to drive movement of the first shaped cam. The engagement configuration of the drive arm normally engages with engagement portions provided on the first shaped cam as explained below.

The drive arm is preferably mounted for movement in both directions (forwardly and rearwardly) and drives movement of the first shaped cam in both directions (rotating) about a substantially central mounting axis. In some configurations, one or more guides may be provided adjacent to drive arm in order to ensure a correct or required movement. Where provided, the guides will typically be mounted relative to the spine plate and extend laterally.

The engagement configuration of the drive arm will typically include an opening in a side edge of a substantially planar drive arm. Typically the opening will be shaped and according to a particularly preferred embodiment, the opening will have a pair of opposed C-shaped ends with a planar linking edge therebetween along one side of the opening only. According to this particular configuration, both of the substantially C-shaped ends of the opening can act as engagement surfaces to engage the engagement portions provided on the first shaped cam to move the first shaped cam in both directions depending upon which end of the engagement configuration engages the engagement portions.

Presently, the engagement of the C-shaped ends with the engagement portions provided on and preferably extending laterally from the first shaped cam, will allow movement of the first shaped cam in both directions driven by the respective C-shaped ends of the engagement opening. Preferably, the C-shaped ends of the opening are spaced apart, and normally, further apart than the separation distance between the engagement portions provided on the first shaped cam. According to a particularly preferred embodiment, an outer edge of the drive arm immediately adjacent each of the C-shaped ends is arcuate as well. Typically however, the C-shaped ends of the opening are concave whereas the arcuate periphery immediately adjacent the C-shaped ends is convex. The convex arcuate periphery can preferably be used to move the drive arm relative to the first shaped cam or vice versa through abutment with the preferred engagement portions provided on the first shaped cam which are generally shaped to slide over the arcuate periphery as required. A point or peak is preferably provided at the transition from the C-shaped opening to the convex arcuate periphery which may prevent accidental dislodgement of the drive arm from the engagement portions provided on the first shaped cam, but not determine movement driven by the shifting lever.

The converter assembly of the present invention includes a first shaped cam for rotation driven by the drive arm. The first shaped cam is preferably substantially planar when viewed from above and is normally mounted parallel to the drive arm and the spine plate of the converter assembly. The first shaped cam is preferably mounted coaxially with the first gear of the converter assembly. Preferably, the first shaped cam is mounted between the first gear and the spine plate. The teeth of the first gear will typically extend radially beyond the edge of the first shaped cam.

The first shaped cam is generally circular when viewed in side elevation but with shaped protrusions on or extending from the edge. The shaped protrusions are preferably extensions which are shaped to move the shifter rod rotating arm when the first portion of the shift rod rotating arm moves over the shaped protrusion due to rotation of the first shaped cam. This action will typically move the shifter rod rotating arm which in turn rotates the elongate shifter rod to allow engagement of different connector rods provided in the gearbox. Normally, this will move the elongate shifter rod from neutral to between the first and second gears in the gearbox and from between the first and second gears to between the third and fourth gears of the gearbox and the like. It will be appreciated by the person skilled in the art that multiple connector rods will normally be provided in the gearbox and that the elongate shifter rod will typically be moved to engage each connector rod as required as the driver works their way up through the gears and down through the gears and also into reverse.

The first shaped cam may also be provided with a number of laterally extending engagement portions. Alternatively and more preferred, the laterally extending engagement portions extend from a rear surface of the first gear towards the first shaped cam.

The engagement portions will preferably be pins or arms extending outwardly away from the surface of the first shaped cam furthest from the spine plate or alternatively the rear surface of the first gear towards the first shaped cam. The engagement portions will typically be shaped and will preferably be cylindrical having a circumferential surface which is engaged by the C-shaped openings of the drive arm as required. Typically, the engagement portions are spaced substantially equally about the first shaped cam or first gear except for a larger separation distance provided between the engagement portion corresponding to the first gear and of the engagement portion corresponding to the fifth gear. The engagement portions are preferably spaced apart such that when a C-shaped opening of the drive arm engages with one engagement portion, the opposite C-shaped opening is free of an adjacent engagement portion.

The number of engagement portions provided will depend on the number of gears in the gearbox. Five engagement portions are used for a gearbox with six forward gears and reverse but the number will typically change for a 5 or 7 speed gearbox for example.

The converter assembly of the present invention also includes a first gear for movement caused by movement of the first shaped cam. Typically, the first gear will be mounted for movement with the first cam. Typically, the first gear and first shaped cam will be mounted coaxially with one another. The first gear will therefore preferably be mounted substantially parallel to the spine plate and further away from the spine plate than the first shaped cam.

The first gear will typically engage with the second gear of the converter assembly such that rotation of the first gear causes rotation of the second gear. The first gear will typically be a larger in diameter than the second gear.

Preferably, the first gear has a plurality of teeth which are interleaved or meshed with a plurality of teeth provided on the second gear. Typically, the first gear is a spur gear or straight cut gear. The first gear is preferably mounted such that a portion of the first gear engages with the engagement portions provided on the first shaped cam as well. According to a preferred embodiment, the engagement portions extending laterally from the first shaped cam are received into corresponding openings provided on the first gear or vice versa if engagement portions extend from the first gear. This will act to brace the engagement portions as well as to confine the drive arm between the first shaped cam and the first gear. Still further, this will allow load sharing between the first shaped cam and the first gear when load is placed onto the engagement portions by the drive arm during shifting. According to a particularly preferred embodiment, the first portion of the shifter rod rotating arm is also located between the first gear and the spine plate. The first gear is preferably mounted on the first side of the spine plate with the first shaped cam.

The converter assembly of the present invention also includes a second gear for movement caused by movement of the first gear. As mentioned above, typically the first gear and second gear will have meshed teeth such that rotation of the first gear causes rotation of the second gear. The second gear is preferably mounted on the same side of the spine plate as the first gear. As mentioned above, the second gear will typically be smaller in diameter than the first gear. The second gear is typically mounted coaxially with the second shaped cam although on the opposite side of the spine plate to the second shaped cam. Therefore, according to a preferred embodiment, the second gear rotates with the second shaped cam and preferably, it is the rotation of the second gear which forces movement of the second shaped cam.

The second shaped cam preferably rotates with the second gear. The second shaped cam is preferably a tri-lobed cam. The second shaped cam is preferably substantially heart shaped with a pair of lobes at one end thereof and a third lobe at an opposite end of the shaped cam. Normally, arcuate transitions are provided between all of the lobes but the arcuate transition between the pair of lobes at one end and the third lobe will preferably form arcuate sidewalls which are greater in length than the transition between the pair of lobes at the one end.

The second shaped cam preferably abuts at least one, and preferably a pair of mounts or followers for the reciprocating shifter member. Of the pair of mounts or followers, one can be fixed and one can be movable or both can be fixed. The rotation of the second shaped cam will preferably move the reciprocating shifter member forward and backward according to the movement of the first shaped cam which is transmitted through the first and second gears. The reciprocating shifter member preferably moves guided by the mounts or followers.

If the base circle was larger in the second cam, then the second cam could take on a more diamond shape. The particular shape is less important than the function of the second cam. The defining functionality of the second cam is that when the second cam is in a neutral or in-gear position. So when positioned at 0, 90, 180 or 270 degrees (assuming the point of maximum lift is 0 degrees), the second cam will normally be in contact with both mounts or followers of the shifting member to locate the shifting rod. In practice the mounts or followers would actually have a small clearance so the second cam would normally only be in contact with one of the mounts or followers, but at times between the angles mentioned above, the second cam will preferably be optimised to provide leverage where required and speed where required and both followers would not contact the lobes of the second cam.

The converter assembly of the present invention also includes a reciprocating shifter member moved according to movement of the second shaped cam. The shifter member may have any shape but is preferably elongate. The sifter member is mounted on or relative to the number of mounts for reciprocal movement relative to the spine plate. The shifter member is typically approximately perpendicular to the shifting lever and substantially parallel to the connector rods of the gearbox. The shifter member is preferably attached to the shifter rod of the converter assembly. The shifter member is preferably mounted outside the second shaped cam, away from the spine plate although normally, a portion of the shifter member or a component attached thereto, will engage with an outer edge of the second shaped cam in order to be moved by the second shaped cam.

Normally a number of roller guides are provided which guide movement of the shifter member. At least two roller guides are preferred at either end of the shifter member, one upper roller guide and one lower roller guide. The roller guides will normally be provided on the same side of the spine plate as the second shape cam and the shifter member.

According to a particularly preferred embodiment, the shifter member is substantially F-shaped when viewed in plan with a pair of extensions extending laterally from a substantially planar body located between the roller guides and abutting one side of the spine plate. Preferably, the second shaped cam and the mounts for the shifter member are located between the pair of extensions.

The converter assembly engages an elongate shifter rod of the gearbox which is moved transversely by movement of the reciprocating shifter member. The elongate shifter rod is preferably mounted for both translation and rotation and is moved transversely (translation) by movement of the reciprocating shifter member and is rotated by movement of the shifter rod rotating arm. The shifter rod may be mounted through use of a depending bracket with a collar or cuff into which a portion of smaller dimension of the shifter rod can be received. This smaller dimensioned portion will typically be defined by a head and a rotating arm adapter portion. The collar or cuff is preferably sandwiched between the head and a rotating arm adapter portion to move the shifter rod with the shifter member.

The shifter rod is preferably attached to one end of the shifter member for reciprocal movement with the shifter member. The shifter rod can be externally mounted as well using an adapter in order to attach the shifter rod relatives to be shifter member. In this configuration, the spine plate may be provided with a guide mounted thereon in order to guide reciprocal movement of the shifter rod.

The converter assembly of the present invention preferably includes a shifter rod rotating arm having a first portion biased into contact with the edge of the first shaped cam and a second portion to rotate the elongate shifter rod when urged to by the shape of the first shaped cam during rotation thereof. A biasing assembly will normally be provided to bias the shifter rod rotating into abutment with the edge of the first shaped cam. Typically, the shifter rod rotating arm is pivotally mounted relative to spine plate about a pin but is biased into contact with the first shaped cam. The extensions or protrusions provided on the edge of the first shaped cam preferably forces rotation of the shifter rod rotating arm about the mounting pivot.

The second portion of the shifter rod rotating arm is preferably provided over the length of the rotating arm. The second portion preferably engages with the adapter provided on the elongate shifter rod. The adapter may be an open cuff which extends laterally from the elongate shifter rod. The second portion of the rotating arm may have a cylindrical shape which extends laterally to engage with the cuff. According to this particularly preferred embodiment, when the rotating arm pivots, the second portion and connection with the elongate shifter rod causes rotation of the shifter rod through engagement of the cuff with the second portion. This will typically force the elongate shifter rod to engage with a different connector rod in the gearbox.

In an alternative embodiment, the first gear and first cam can be provided as a single component. In this embodiment, the first cam can be provided on or into a surface, preferably an outer surface of the first gear. In particular, a cam shape can be inscribed or formed into a surface of the first gear to form a cam track or cam race. In this embodiment, the preferred shifter rod rotating arm can be mounted to or relative to a movement arm which is rotatable about the axis of the second gear and which is moved by a secondary selection lever. One end of the movement arm preferably has a pin or similar that rides in the cam track or cam race of the single component first cam and first gear to cause rotation of the shifter rod as required. This configuration has the advantage of combining two components into one, simplifying the construction and operation of the converter assembly and also eliminating the need for the provision of a spring to tension the shifter rod rotating arm against the first cam.

The secondary selection lever can be used to select reverse by correctly acting on the movement arm. A ratchet arm is also typically provided in order to index the rotation of the single component first cam and first gear through engagement with the engagement portions on the opposite side of the combined first cam and first gear to the preferred cam track or cam race.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
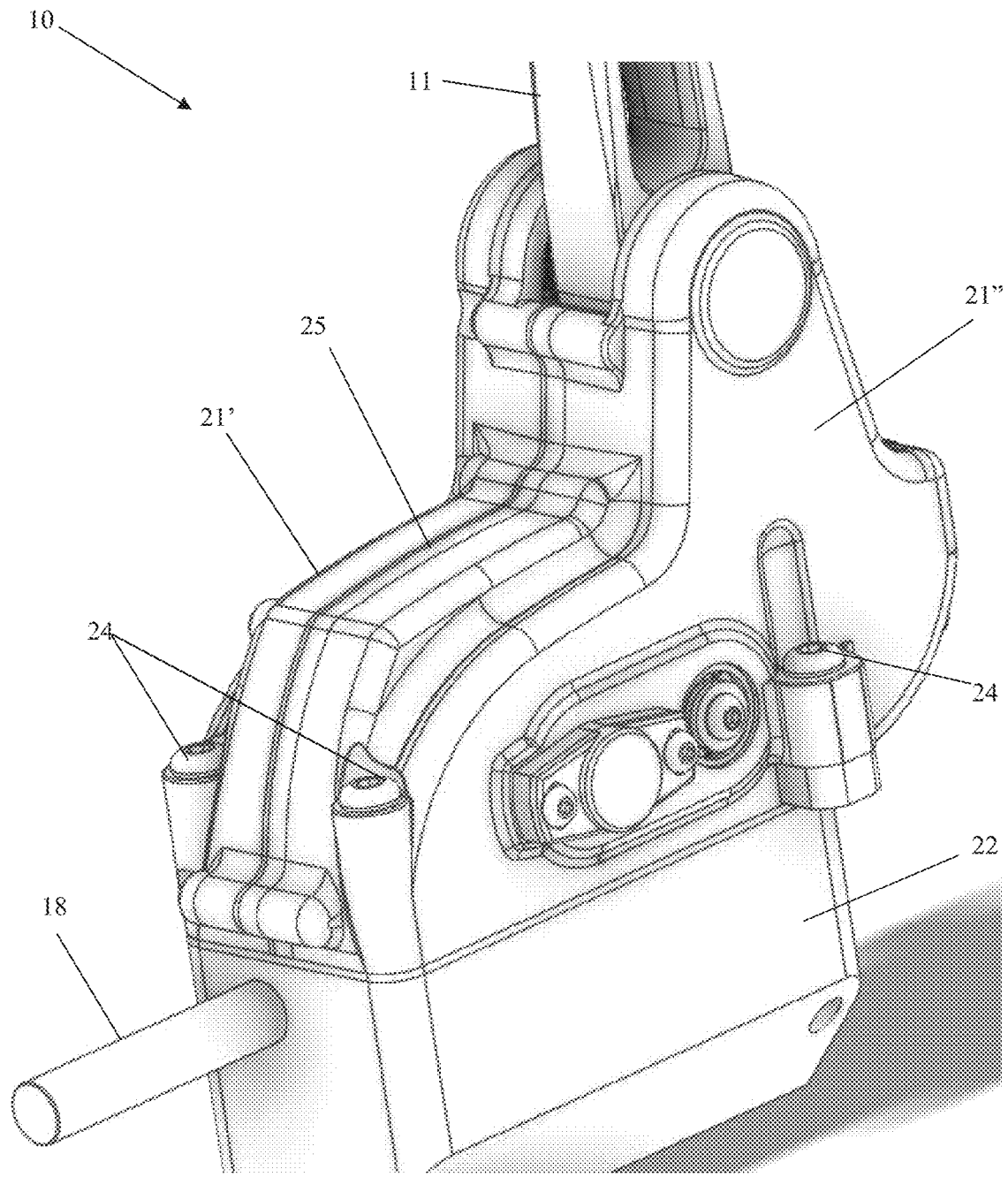
FIG. 1 is an isometric view from a first side of a front end of a sequential shift gearbox converter assembly according to a preferred embodiment of the present invention.

In a particularly preferred embodiment of the present invention, a sequential shift gearbox converter assembly to convert a H-pattern gearbox to a sequentially shifted gearbox is provided.

Although different embodiments are illustrated, the sequential shift gearbox converter assembly 10 illustrated in each of the Figures includes:
  a) A shifting lever 11 mounted relative to a converter housing;
  b) A drive arm 12 mounted for movement driven by the shifting lever 11;
  c) A first shaped cam 13 for rotation driven by the drive arm 12;
  d) A first gear 14 for movement caused by movement of the first shaped cam 13;
  e) A second gear 15 for movement caused by movement of the first gear 14;
  f) A second shaped cam 16 mounted for movement when the second gear 15 is moved;
  g) A reciprocating shifter member 17 moved according to movement of the second shaped cam 16 to in turn move an elongate shifter rod of a gearbox transversely; and
  h) A shifter rod rotating arm 19 having a first end 20 biased into contact with the first shaped cam 13 and a second portion to rotate the elongate shifter rod 18 when urged to by the shape of the first cam 13 during rotation thereof.

Figure 2:
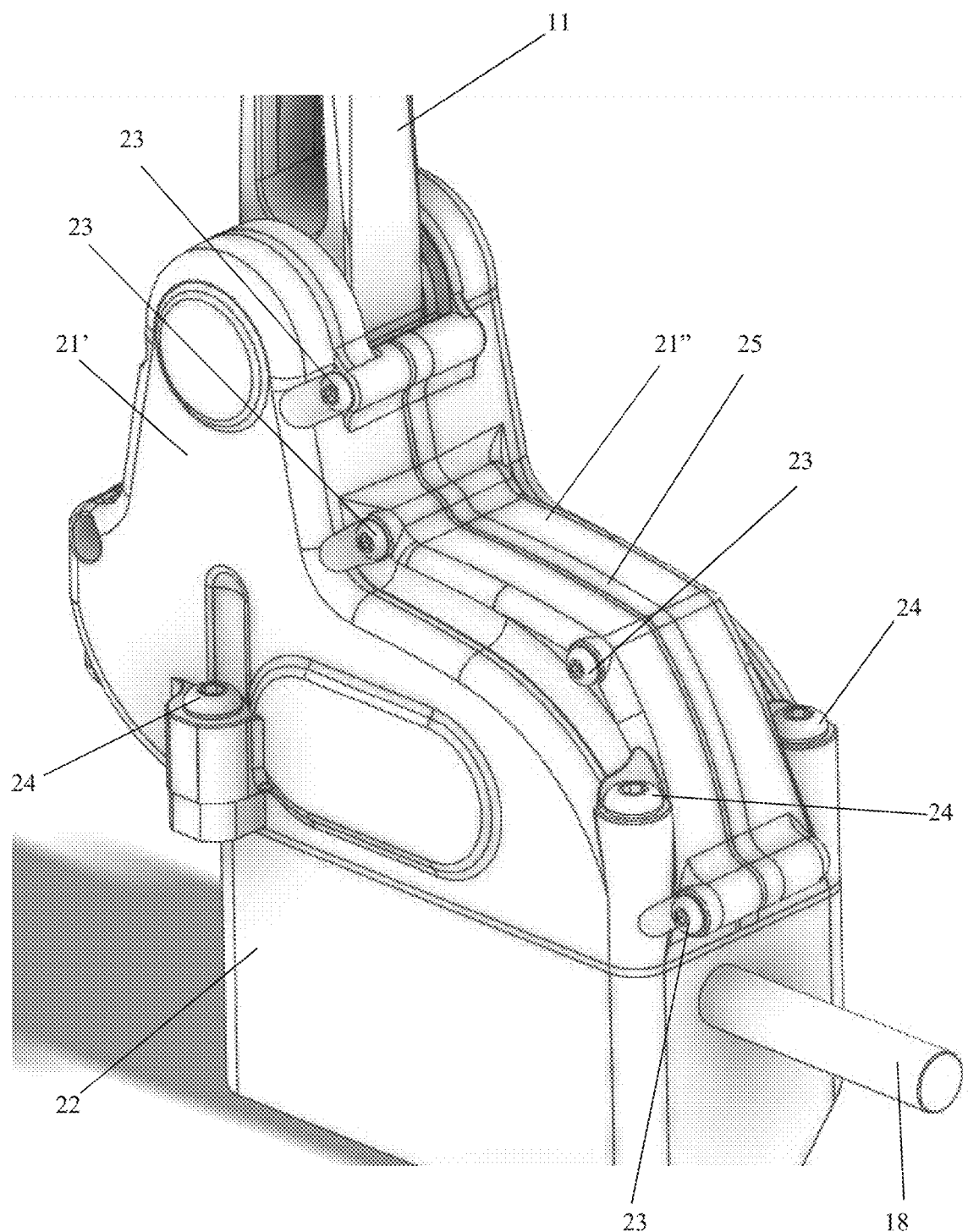
FIG. 2 is an isometric view from a second side of the sequential shift gearbox converter assembly illustrated in FIG. 1.
Figure 3:
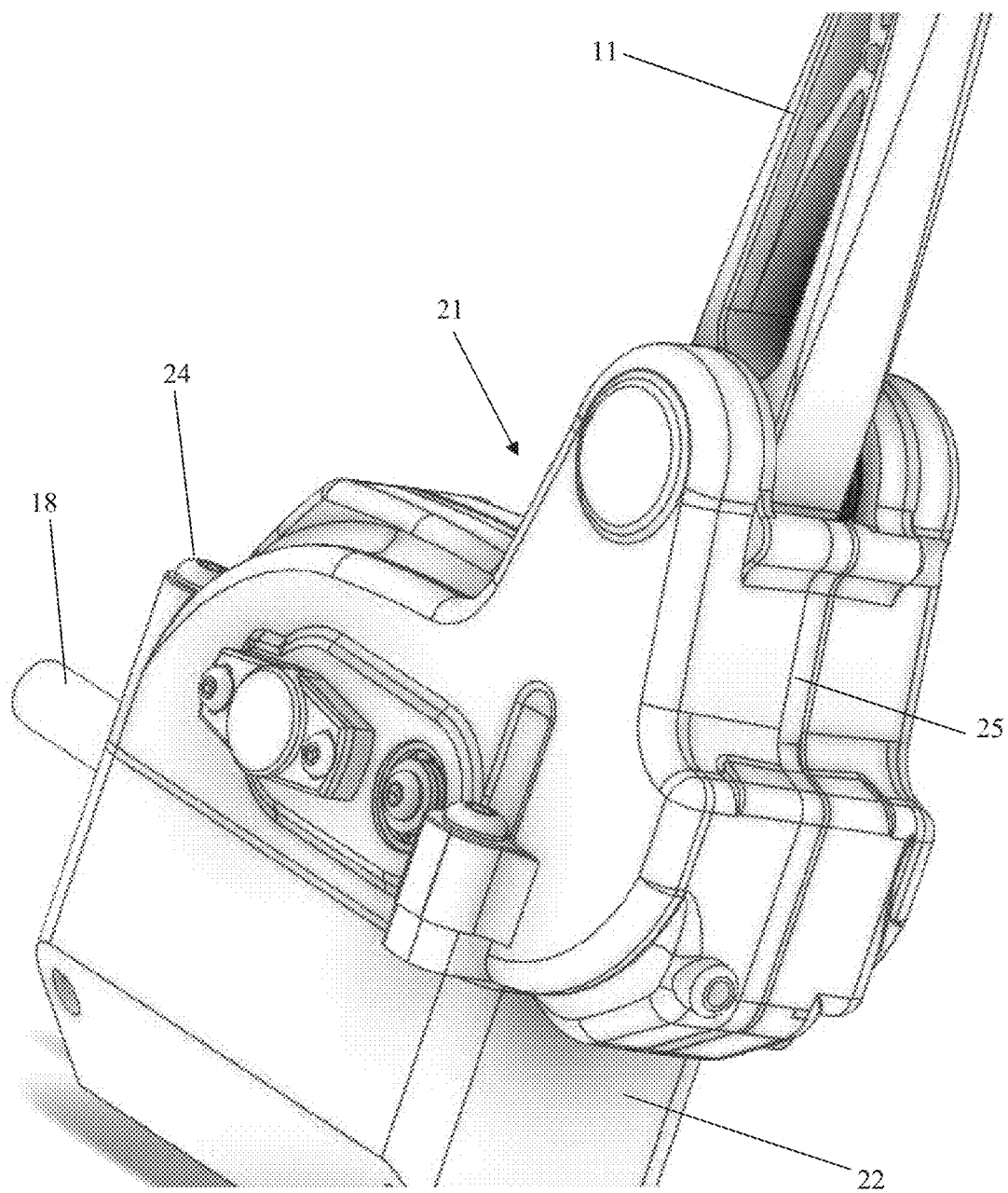
FIG. 3 is an isometric view of a forward end of the sequential shift gearbox converter assembly illustrated in Union one.
Figure 25:
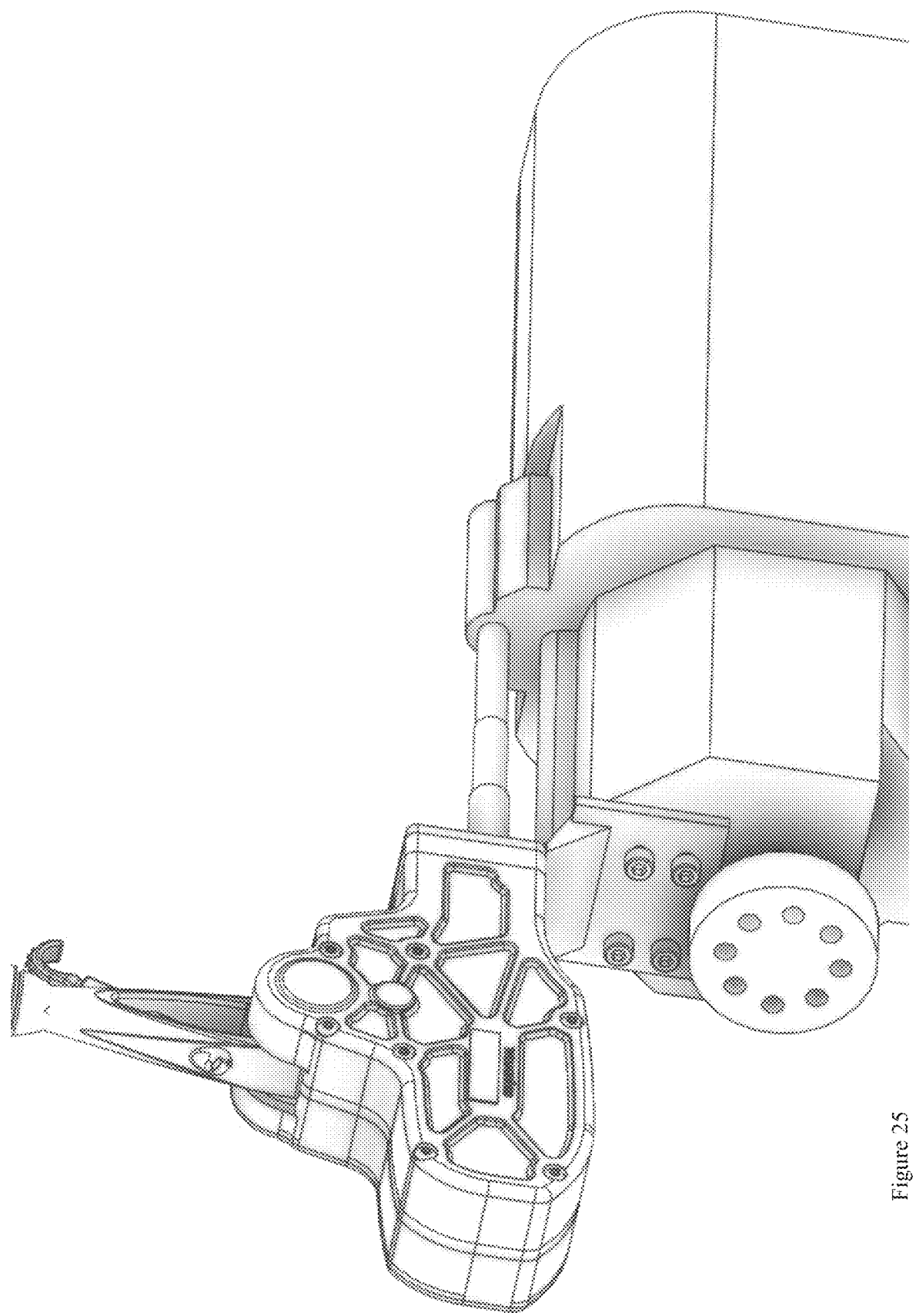
FIG. 25 is an isometric view from a first angle of a mounting configuration used to mount the converter assembly of one preferred embodiment relative to a vehicle gearbox.
Figure 26:
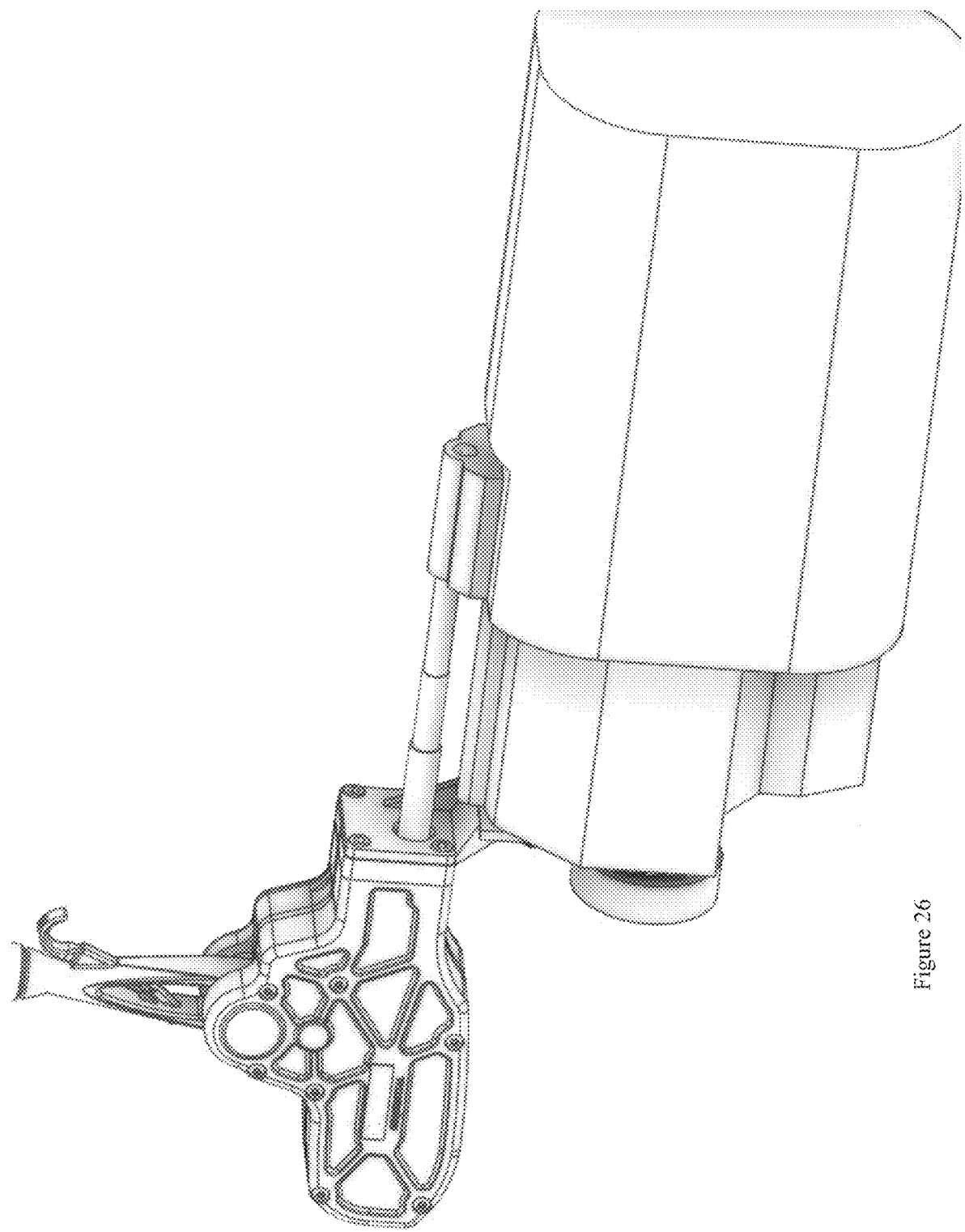
FIG. 26 is an isometric view from a second angle of the mounting configuration illustrated in FIG. 25.

As illustrated in FIGS. 1 to 3, the assembly 10 of the preferred embodiment includes a housing allowing the assembly 10 to be mounted relative to a gear box as illustrated generally in FIGS. 25 and 26. The housing encloses most of the components of the assembly in order to protect them. The housing of the illustrated embodiment includes a housing 21 and a gearbox housing 22. The shifting lever 11 is provided relative to the housing 21 and the elongate shifter rod 18 is normally provided at least partially within the gearbox housing 22.

The housing as illustrated is formed from a pair of housing portions 21', 21" attached to one another in order to form a substantially enclosed housing. Normally, elongate fasteners 23 extend through one of the housing portions 21' and at least partially into the other of the housing portions 22". In this configuration, each of the housing portions 21', 21" has a clamshell configuration and elongate fasteners 23 such as screws or bolts.

The gearbox housing 22 illustrated is a one-piece housing with an open top and an opening in one of the end walls to allow the elongate shifter rod 18 to extend from the gearbox housing 22. In this configuration, the gearbox housing 22 is attached to a lower end of each of the upper housing portions 21', 21" using elongate fasteners 24 such as screws or bolts.

Figure 4:
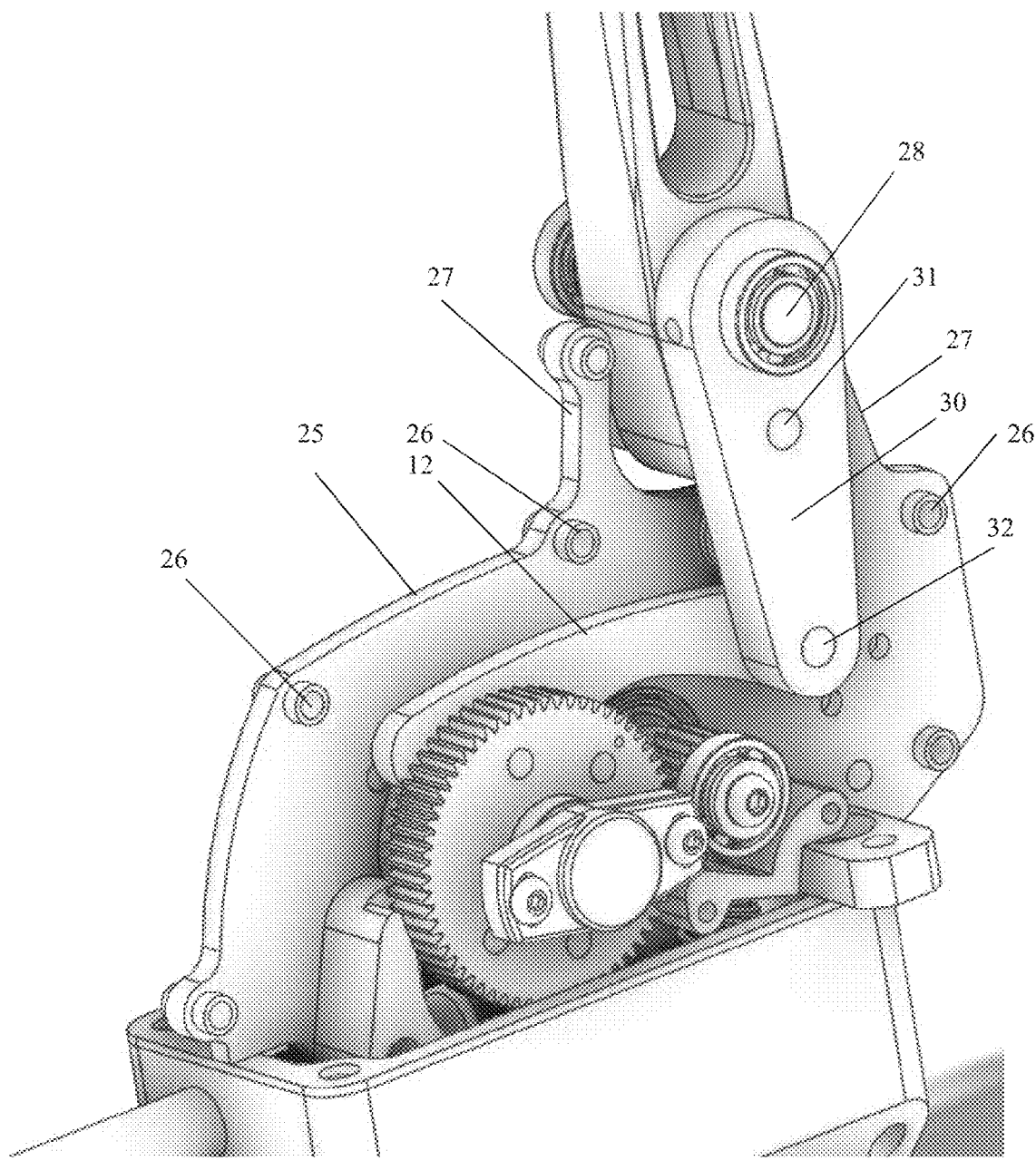
FIG. 4 is an isometric view as illustrated in FIG. 1 with an upper housing portion removed.

The upper housing portions 21', 21" typically attach to one another about a spine plate 25. As illustrated in FIGS. 1 to 3, the spine plate 25 is located approximately centrally across the width of the housing and mounts components of the assembly relative thereto, and within the housing. The illustrated spine plate 25 is sandwiched between the upper housing portions 21', 21". The fasteners 23 used to attach the upper housing portions 21', 21" to one another extend through openings 26 provided in the spine plate 25 as illustrated in FIG. 4 in particular. The external shape of the spine plate 25 corresponds to the shape of the upper housing as illustrated in FIGS. 1 to 3.

The components of the assembly are mounted on either side of the spine plate 25. Some of the components are mounted through the spine plate 25 whereas other components are mounted on one lateral side only of the spine plate 25. Components may be mounted to the spine plate 25 and also the housing portion 21' or 21" on one side of the spine plate 25. Normally, portions mounted relative to the spine plate 25 will be mounted about a boss to allow rotation of the components and translation of the components where required.

Figure 5:
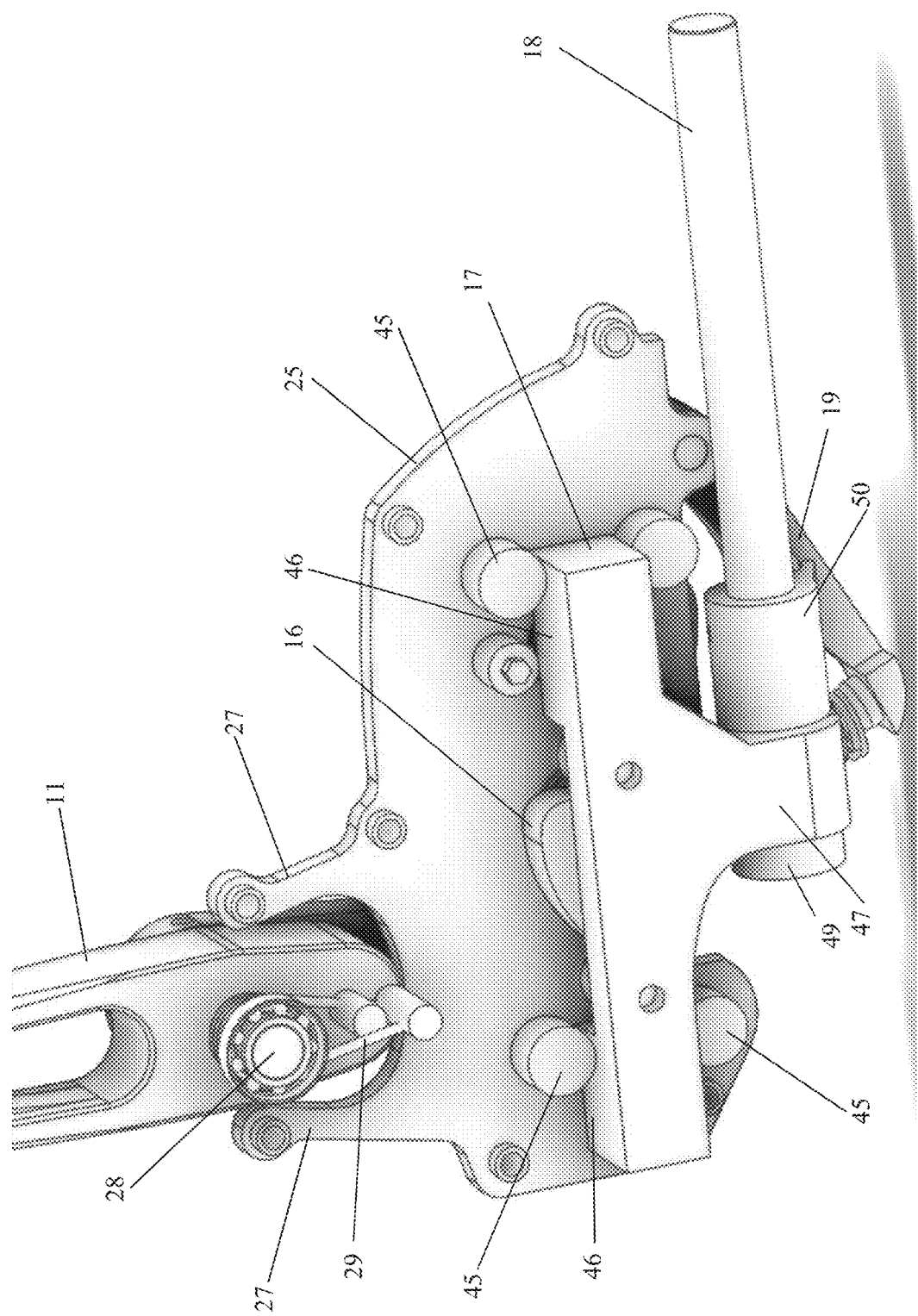
FIG. 5 is a view of the reverse side of the configuration illustrated in FIG. 4.
Figure 6:
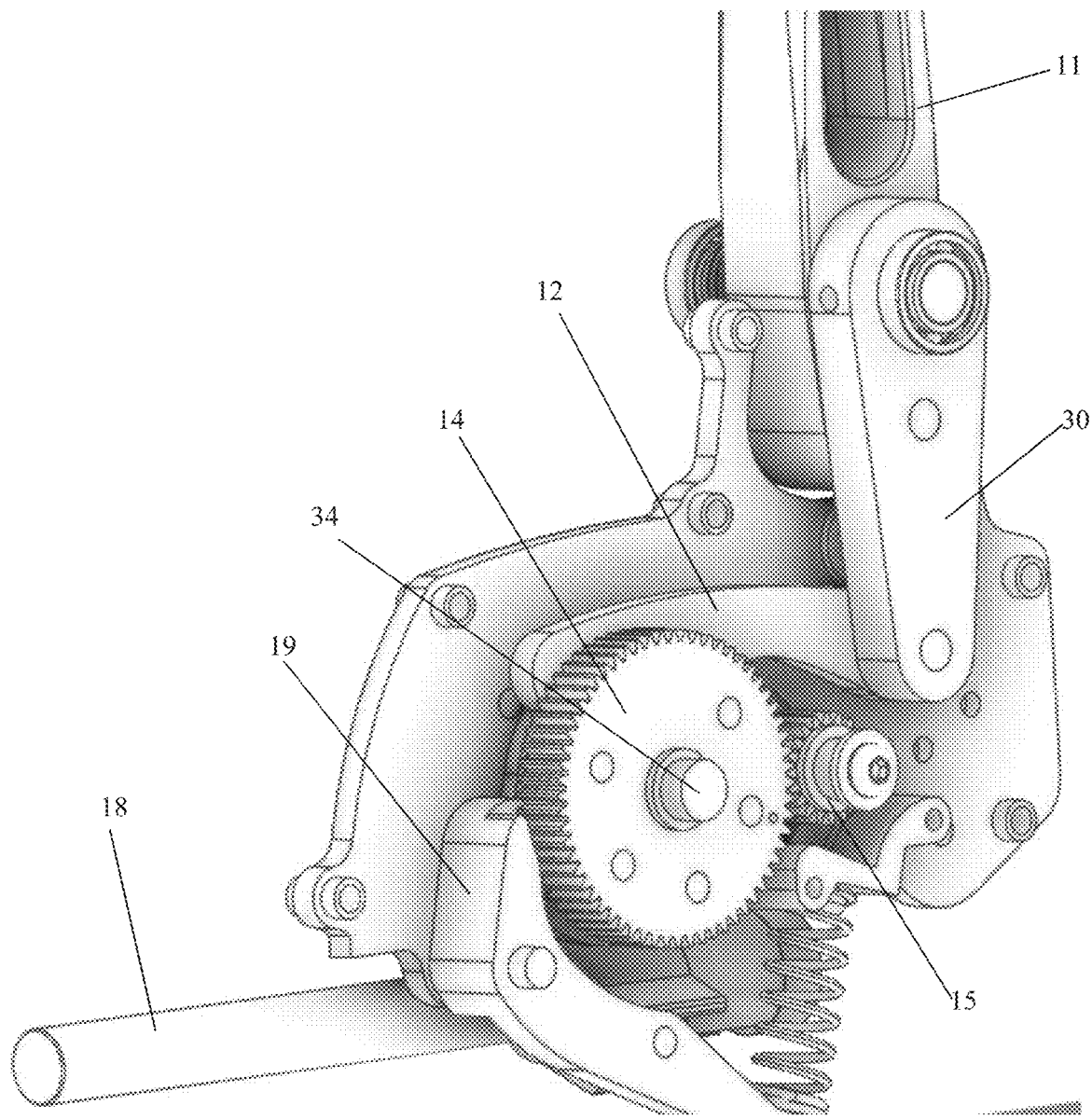
FIG. 6 is a close-up view of the configuration illustrated in FIG. 4 from the front.
Figure 7:
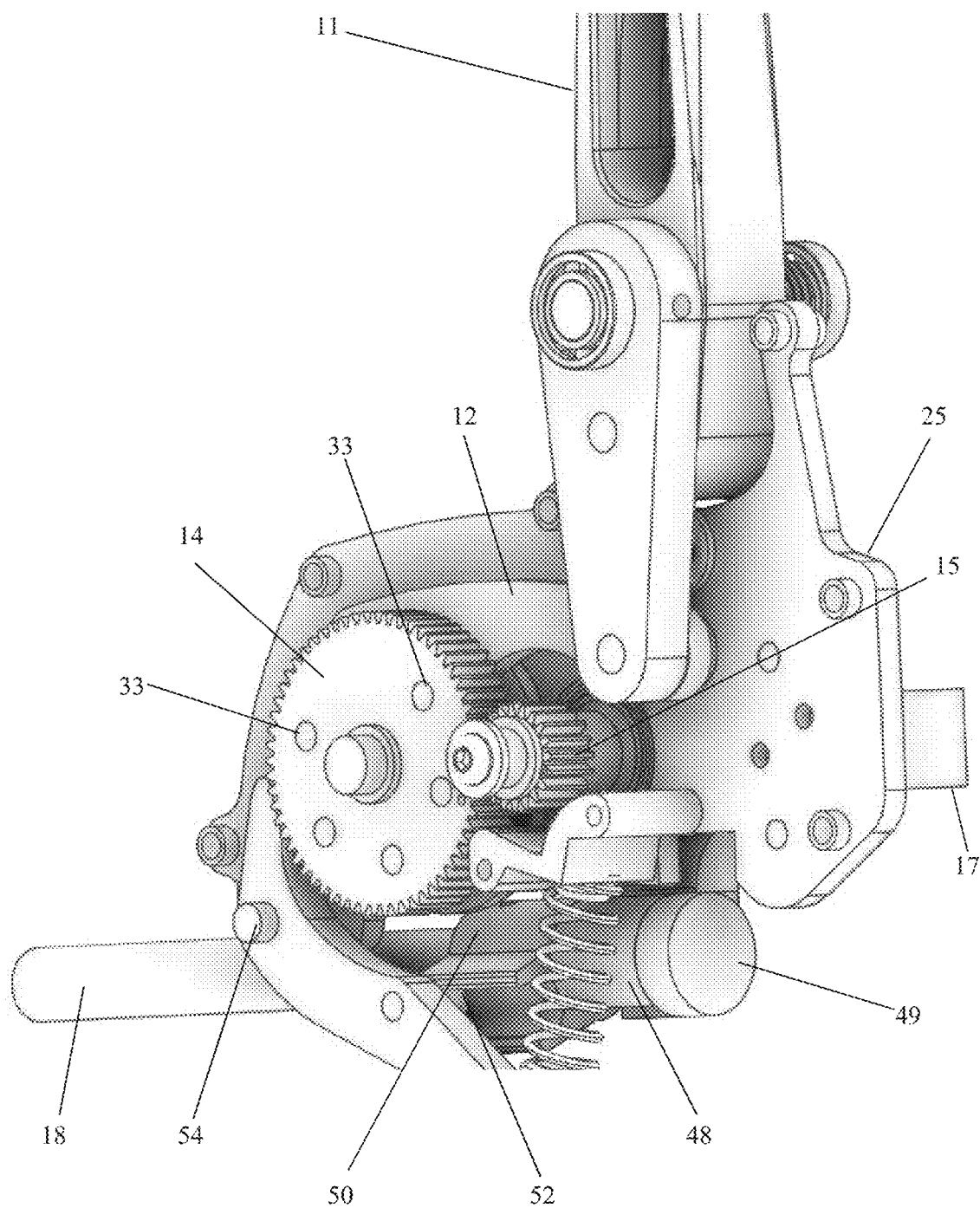
FIG. 7 is a close-up view of the configurations illustrated in FIG. 4 from the rear end.

As illustrated in FIGS. 4 and 5 in particular, the spine plate 25 has a pair of spaced apart extension arms 27 extending in the same plane as the spine plate 25 and between which one end of the shifting lever 11 is located. The extension arms 27 may act as stops to limit the movement of the lower portion of the lever 11 during shifting but also act to provide a housing that substantially encloses the mechanism of the present invention. As illustrated, there will be a forward extension arm in front of the lever 11 and a rear extension arm behind the lower end of the lever 11.

The gearbox converter assembly of the present invention is typically mounted relative to a vehicle gearbox in which the gear shift lever of a H pattern gearbox has been removed. Typically, when this occurs, the connector rods that linked the gearshift of the H pattern gearbox to the moving portions of the gearbox will remain and the converter assembly of the present invention engages with the existing connector rods. In a particularly preferred embodiment, the elongate shifter rod 18 of the present invention will engage with the existing connector rods as required in order to change gears. Preferably, the shifter rod 18 of the present invention is located relative to the connector rods such the movement of the shifter rod 18 engages the connector rods as required and moves the connector rods to change gears.

The shifting lever 11 of the preferred embodiment extends upwardly from the housing of the converter assembly to replace the gearshift lever of the H pattern gearbox, which is removed at installation. The shifting lever 11 is elongate and may have any shape but preferably, a knob or similar gripping assembly (not shown) is provided at an upper end of the shifting lever.

The shifting lever 11 of the illustrated embodiment is mounted pivotally at a pivot mount 28 within the housing and to the housing. The shifting lever 11 is mounted towards but not at the lower end allowing the lower end of the shifting lever, which is spaced from the pivot mount 28 to create leverage at the lower end.

The shifting lever 11 is biased into a central position by a biasing assembly 29 associated with the pivot mount 28 and is then movable forwardly and rearwardly against the bias which returns the shifting lever 11 to a "home" position.

The shifting lever 11 extends downwardly into the housing with the lower end located within the housing and mounted to a connector arm 30 at or towards the lower end of shifting lever 11. As best seen in FIG. 4, the connector arm 30 is located on one lateral side of the lower end of the shifting lever 11 and connects the shifting lever 11 to the drive arm 12 in order to move the drive arm 12 when the shifting lever 11 is moved. The drive arm 12 is moved in a direction which is opposite to the direction in which the shifting lever 11 is moved. The connector arm 30 is directly fixed to the shifting lever 11 at the pivot mount 28 of the shifting lever as well as to the lower end of the shifting lever through an attachment pin 31.

The connector arm 30 is normally completely located within the housing of the converter assembly. The preferred connector arm 30 as illustrated in FIG. 4 is larger in dimension at an upper end and narrows as the connector arm 30 extends downwardly.

The connector arm 30 is mounted on the same side of the spine plate 25 as the first gear 14, second gear 15 and the first shaped cam 13 of the converter assembly. The lower end of the connector arm 30 is mounted pivotally to the drive arm 12 via a pivot pin 32 as this will allow the forward and reverse movement of the shifting lever 11 to be transferred to a forward and reverse movement of the drive arm 12 albeit in the opposite direction to the movement of the shifting lever 11.

The drive arm 12 can have any shape but as illustrated in FIGS. 12 to 19 has an arcuate shape with a shallow curve only. Given that the drive arm 12 normally moves in a reciprocating direction forwardly and rearwardly, the shallow curve of the arcuate drive arm 12 provides strength but also minimises the space to be used. The drive arm 12 is elongate and is substantially planar when viewed from above, having the appearance of a shaped plate.

One end of the drive arm 12 is connected to the connector arm 30 via a pivot pin 32. The opposite end of the drive arm 12 is provided with an engagement configuration (best illustrated in FIGS. 12 to 19 thereon in order to drive movement of the first shaped cam 13. In the illustrated embodiment, the engagement configuration of the drive arm 12 engages with laterally extending engagement portions 33 provided on the first shaped cam 13.

The drive arm 12 is preferably mounted for movement in both directions (forwardly and rearwardly) and drives movement of the first shaped cam 13 in both directions (rotating) about a substantially central mounting axis 34.

As best illustrated in FIGS. 12 to 19, the engagement configuration includes an opening in a side edge of a substantially planar drive arm 12. The opening has a pair of opposed C-shaped ends 35 with a planar linking edge 36 therebetween along one side of the opening only. According to this particular configuration, both of the substantially C-shaped ends 35 of the opening can act as engagement surfaces to engage the engagement portions 33 provided on the first shaped cam 13 to move the first shaped cam 13 in both directions depending upon which end of the engagement configuration engages the engagement portions 33 during upshifting and downshifting.

Figure 13:
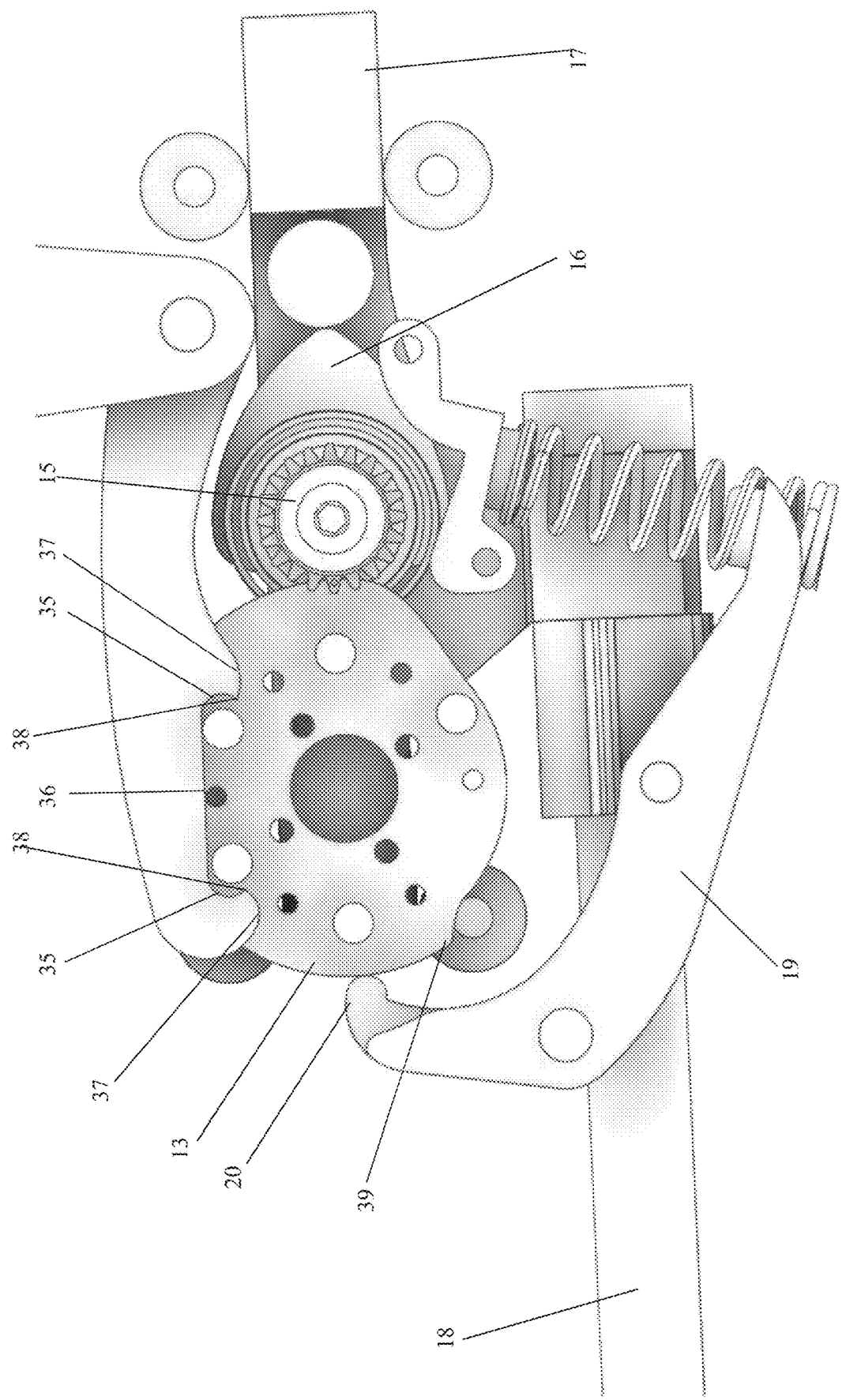
FIG. 13 is a detailed view of the configuration illustrated in FIG. 9 in a third gear.
Figure 14:
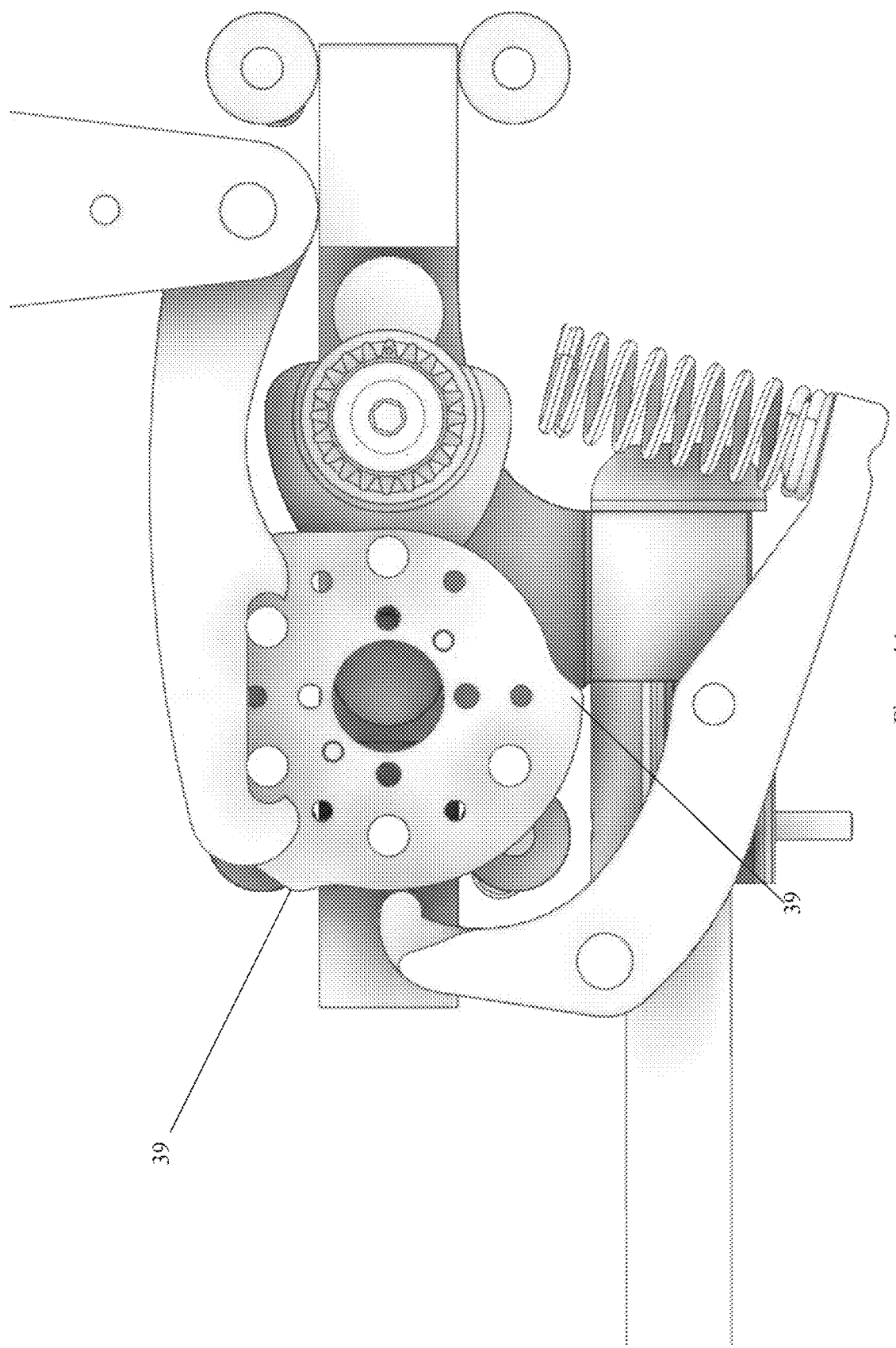
FIG. 14 is a detailed view of the configuration illustrated in FIG. 9 in a fourth gear.
Figure 15:
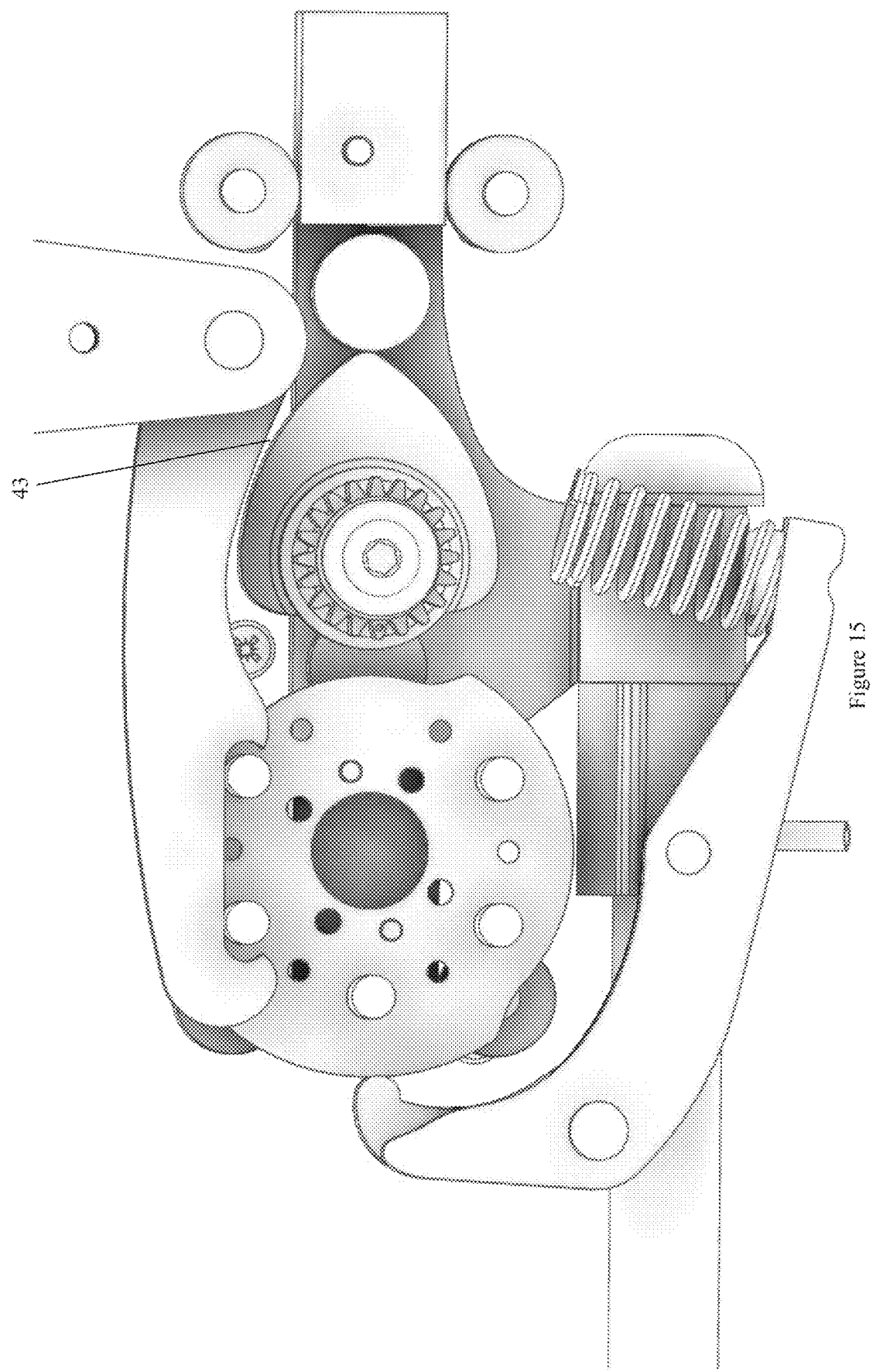
FIG. 15 is a detailed view of the configuration illustrated in FIG. 9 in a fifth gear.
Figure 16:
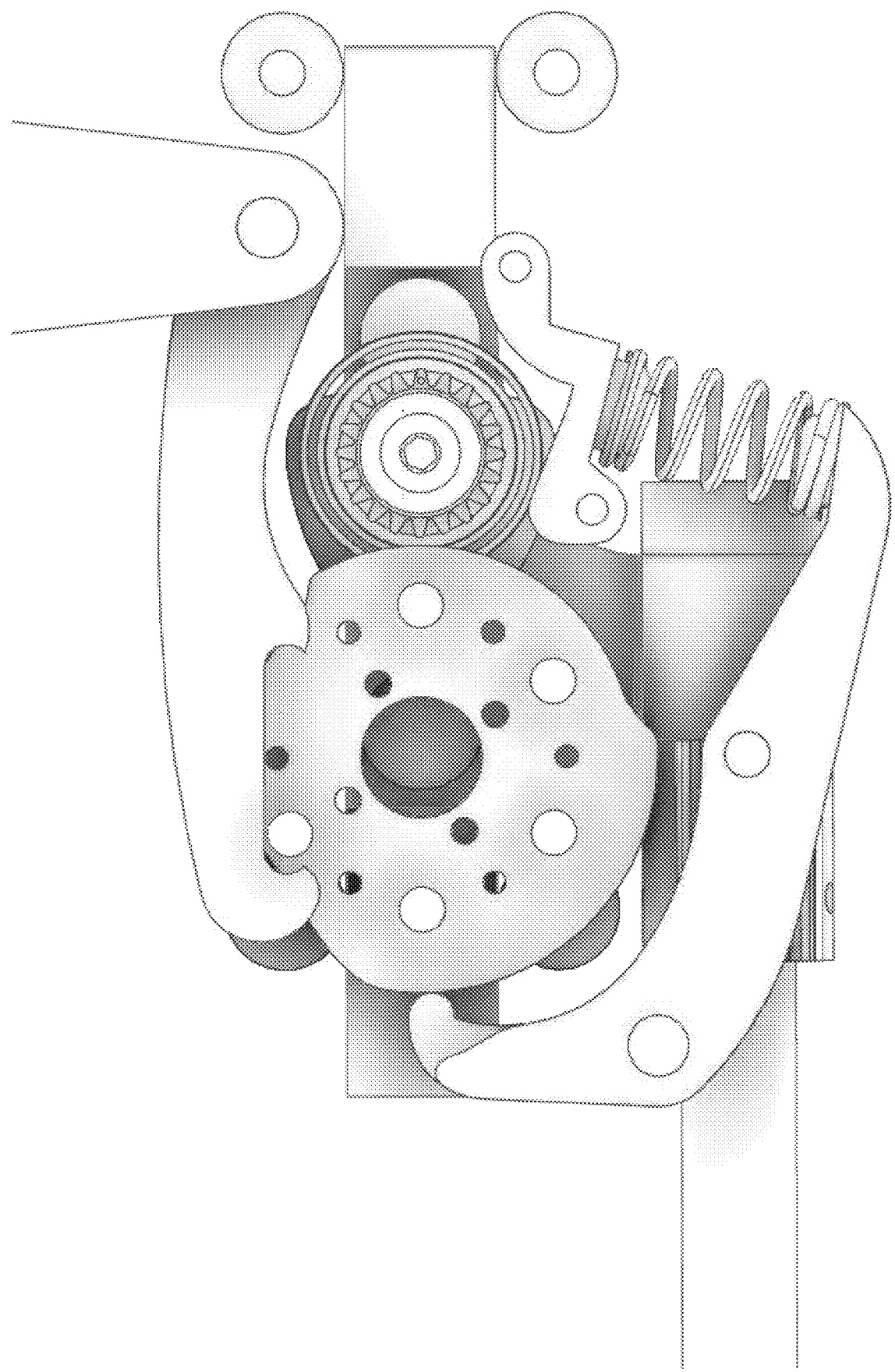
FIG. 16 is a detailed view of the configuration illustrated in FIG. 9 in a sixth gear.
Figure 17:
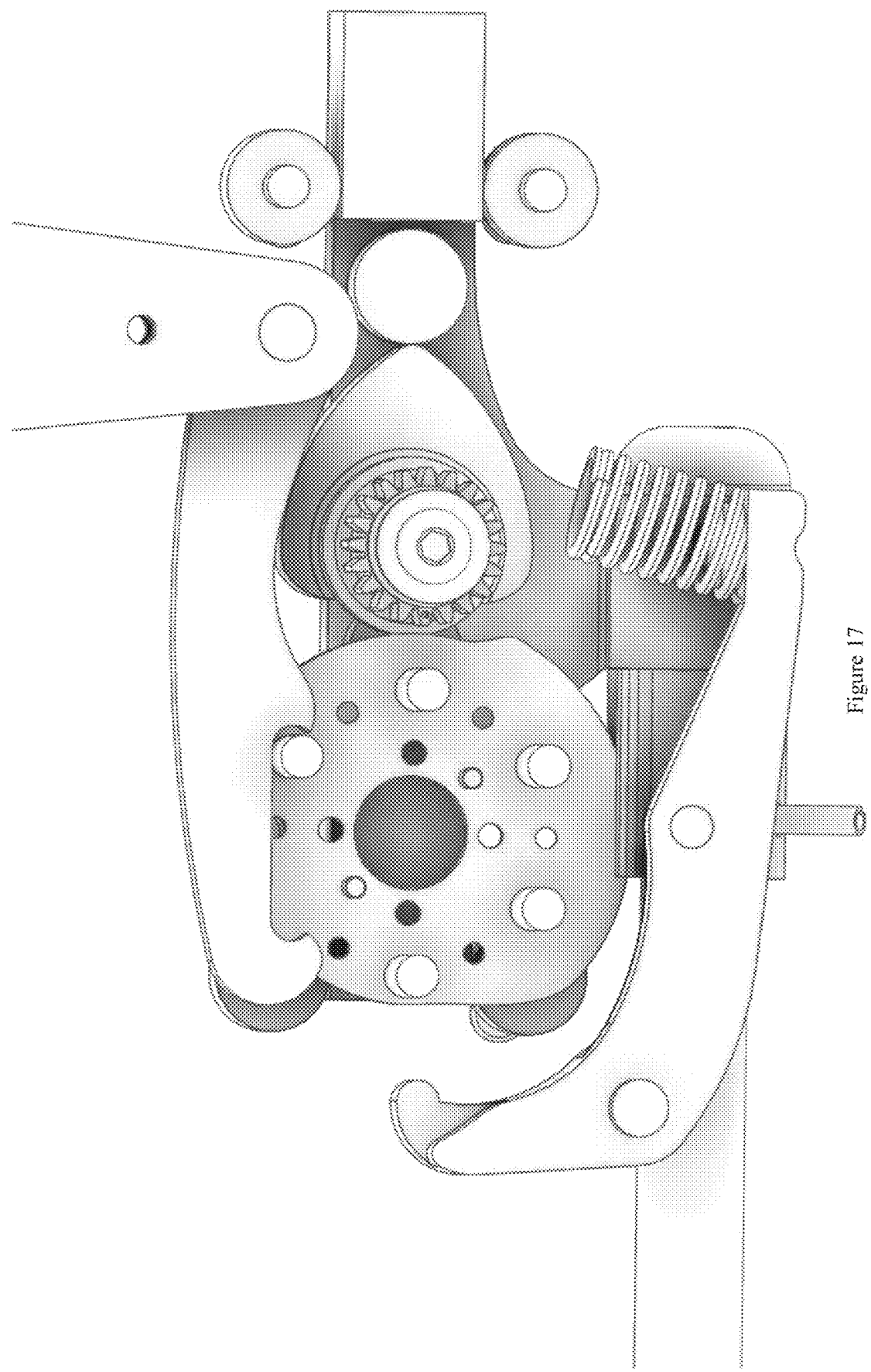
FIG. 17 is a detailed view of the configuration illustrated in FIG. 9 with reverse gear selected.

As illustrated, the C-shaped ends 35 of the opening are spaced apart, and normally, further apart than the separation distance between the engagement portions 33 provided on the first shaped cam 13 as illustrated particularly in FIG. 13. Each outer edge or periphery 37 of the drive arm 12 immediately adjacent each of the C-shaped ends 35 is arcuate as well. The arcuate periphery 37 immediately adjacent the C-shaped ends is convex which can be used to move the drive arm 12 relative to the first shaped cam 13 or vice versa through abutment with the engagement portions 33 provided on the first shaped cam 13 which are generally shaped to slide over the arcuate periphery 37 as required. A point or peak 38 is provided at the transition from the C-shaped opening 35 to the convex arcuate periphery 37 to prevent accidental dislodgement of the drive arm 12 from the engagement portions 33 provided on the first shaped cam 13 but not determined movement driven by the shifting lever 11.

Figure 11:
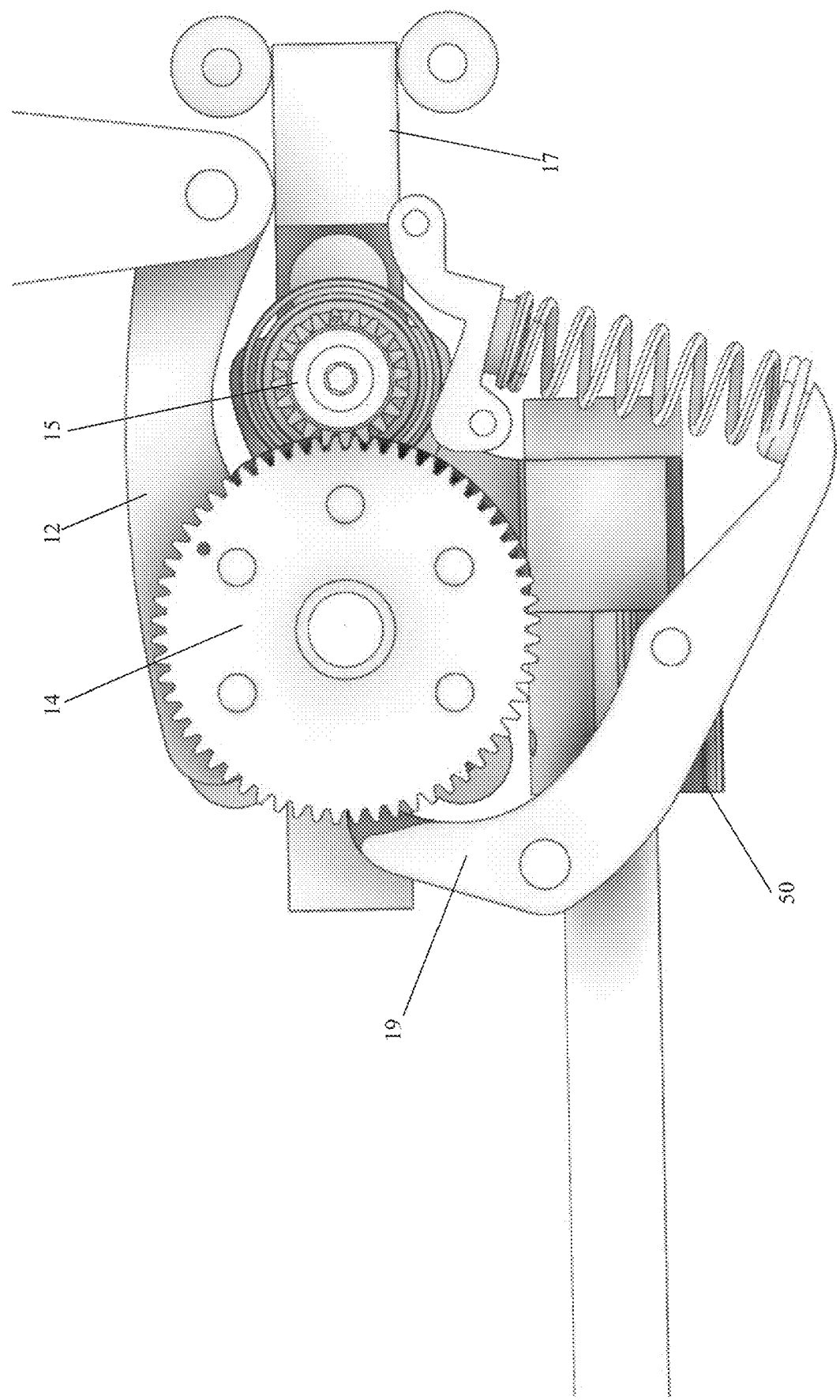
FIG. 11 is a detailed view of the configuration illustrated in FIG. 9 with the reciprocating shifter member in a second position corresponding to a second gear in an H-pattern gearbox.
Figure 12:
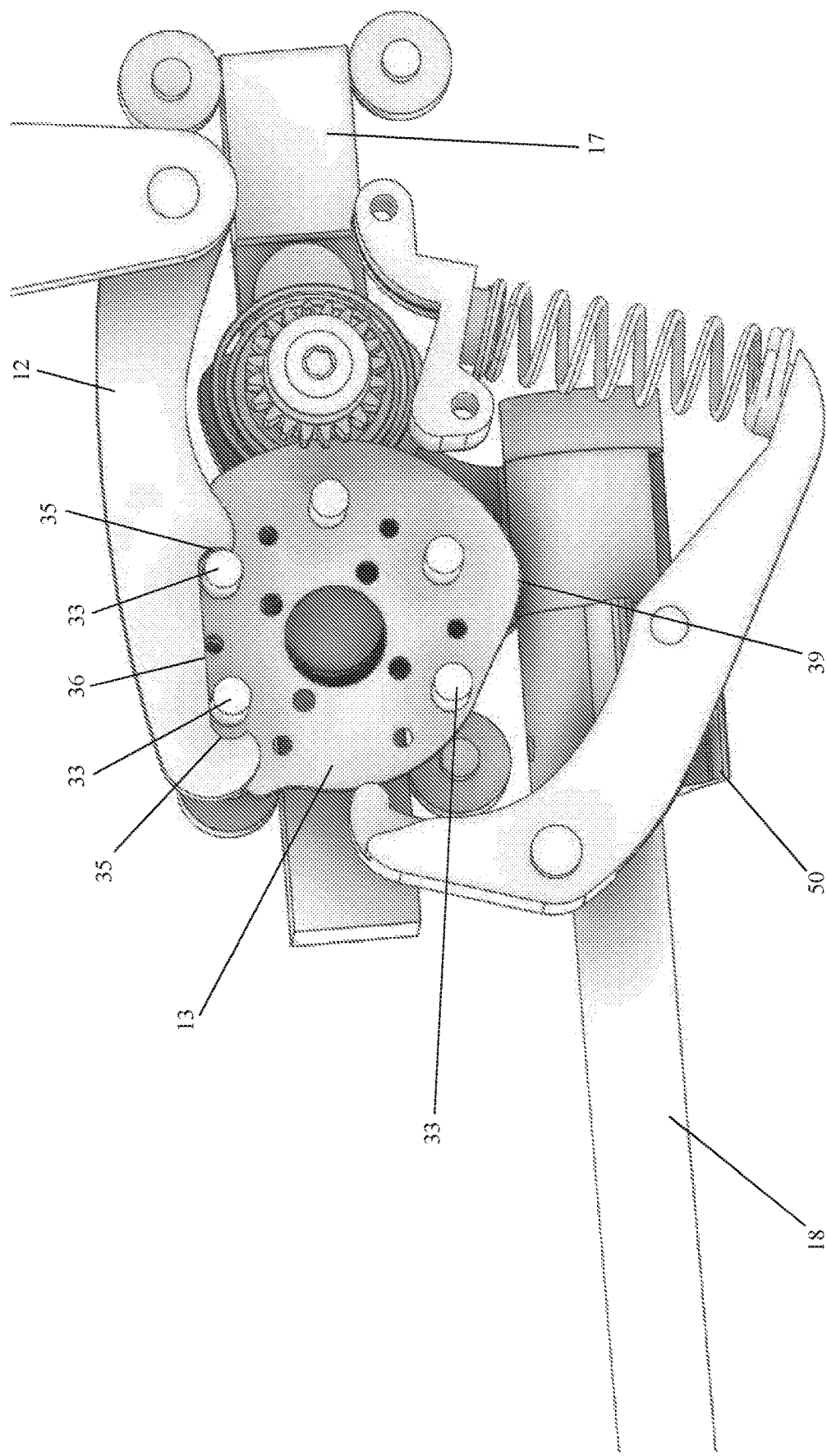
FIG. 12 is a detailed view of the configuration illustrated in FIG. 11 with the first gear of the converter assembly removed for clarity.

The first shaped cam 13, best illustrated in FIGS. 12 to 19 is substantially planar when viewed from above and is normally mounted parallel to the drive arm 12 and the spine plate 25 of the converter assembly. The first shaped cam 13 is mounted coaxially with the first gear 14 of the converter assembly and between the first gear 14 and the spine plate 25. As illustrated in FIG. 11, the teeth of the first gear 14 will typically extend radially beyond the edge of the first cam 13.

The first shaped cam 13 is generally circular when viewed in side elevation but with shaped protrusions 39 on or extending from the edge. The shaped protrusions 39 are preferably extensions which are shaped to move the shifter rod rotating arm 19 when the first end 20 of the shifter rod rotating arm 19 moves over the shaped protrusion 39 due to rotation of the first shaped cam 13. This action moves the shifter rod rotating arm 19 which in turn rotates the elongate shifter rod 18 to allow engagement of different connector rods provided in the gearbox.

The first shaped cam 13 is also provided with a number of laterally extending engagement portions 33. The engagement portions 33 are pins or arms extending outwardly away from the surface of the first shaped cam 13 furthest from the spine plate 25. The engagement portions 22 are cylindrical having a circumferential surface which is engaged by the C-shaped openings 35 of the drive arm 12 as required. As illustrated in FIGS. 12 to 19, there are five engagement portions 33. Typically, the five engagement portions 33 are spaced substantially equally about the first shaped cam 13 except for a larger separation distance 40 provided between the engagement portion 33 corresponding to the first gear and of the engagement portion 33 corresponding to the fifth gear as illustrated in FIG. 19. The engagement portions 33 are spaced apart such that when a C-shaped opening 35 of the drive arm 12 engages with one engagement portion 33, the opposite C-shaped opening 35 is free of the adjacent engagement portion 33.

According to the illustrated embodiment, the first gear 14 is mounted for movement with the first cam 13. Typically, the first gear 14 and first shaped cam 13 will be mounted coaxially with one another. The first gear 14 is therefore preferably mounted substantially parallel to the spine plate 25 and further away from the spine plate 25 than the first shaped cam 13.

The first gear 14 engages with the second gear 15 such that rotation of the first gear 14 causes rotation of the second gear 15. The first gear 14 will typically be a larger in diameter than the second gear 15.

Preferably, the first gear 14 has a plurality of teeth which are interleaved or meshed with a plurality of teeth provided on the second gear 15. Typically, the first gear 14 is a spur gear or straight cut gear. The first gear 14 is preferably mounted such that the engagement portions 33 provided on the first shaped cam 13 are engaged by the first gear 14 as well received into corresponding openings provided on the first gear 14 to brace the engagement portions 33 as well as to confine the drive arm 12 between the first shaped cam 13 and the first gear 14.

According to the preferred embodiment, the first end 20 of the shifter rod rotating arm 19 is also located between the first gear 14 and the spine plate 25. The first gear 14 is mounted on the first side of the spine plate 25 with the first shaped cam 13.

As mentioned above, typically the first gear 14 and second gear 15 have meshed teeth such that rotation of the first gear 14 causes rotation of the second gear 15. The second gear 15 is preferably mounted on the same side of the spine plate 25 as the first gear 14. As mentioned above, the second gear 15 is smaller in diameter than the first gear 14. The second gear 15 is mounted coaxially with the second shaped cam 16 although on the opposite side of the spine plate 25 to the second shaped cam 16. Therefore, according to the preferred embodiment, the second gear 15 rotates with the second shaped cam 16 and it is the rotation of the second gear 15 which forces movement of the second shaped cam 16.

Figure 8:
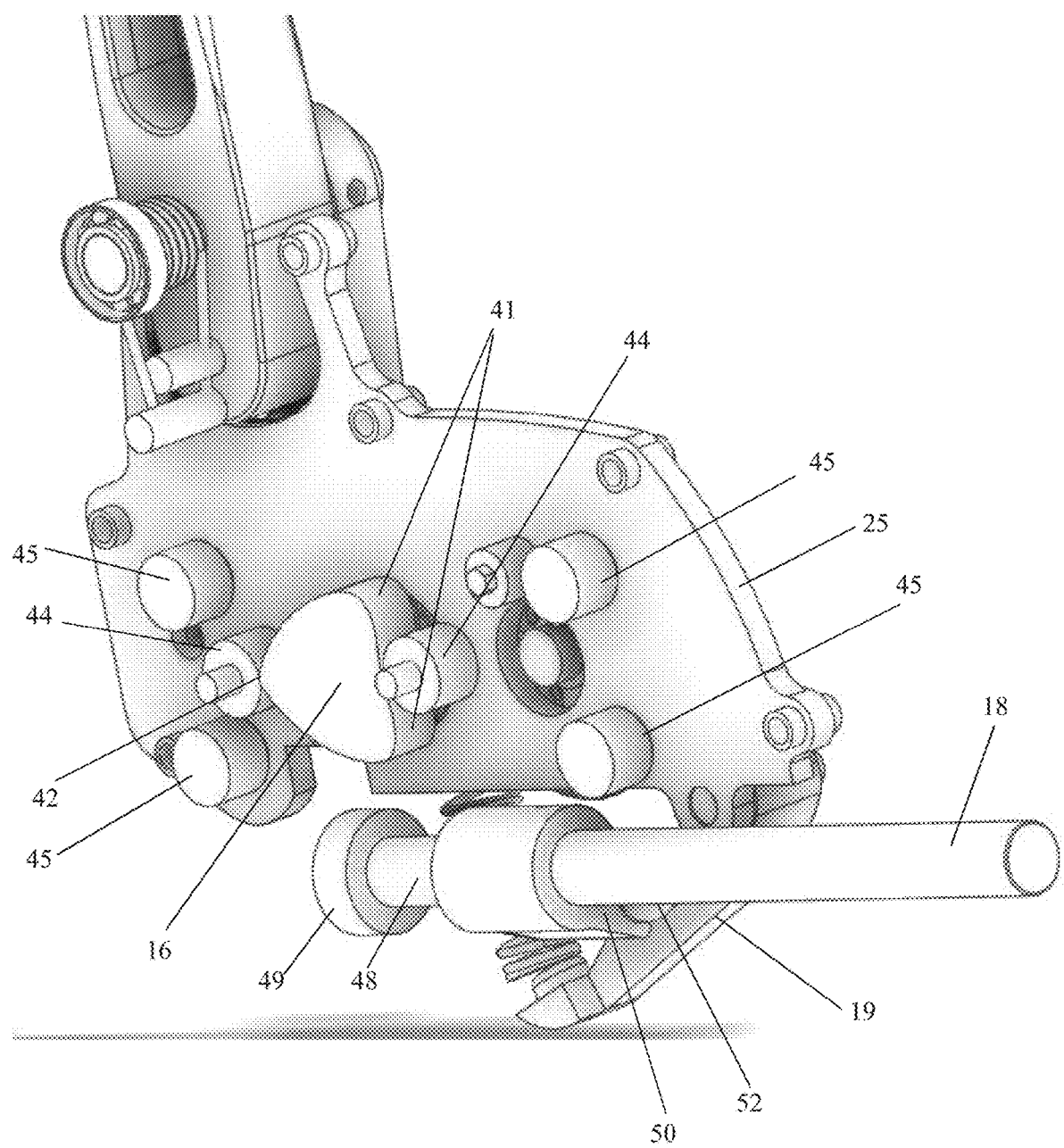
FIG. 8 is a view of the configuration illustrated in FIG. 5 with the reciprocating shifter member removed for clarity purposes.
Figure 9:
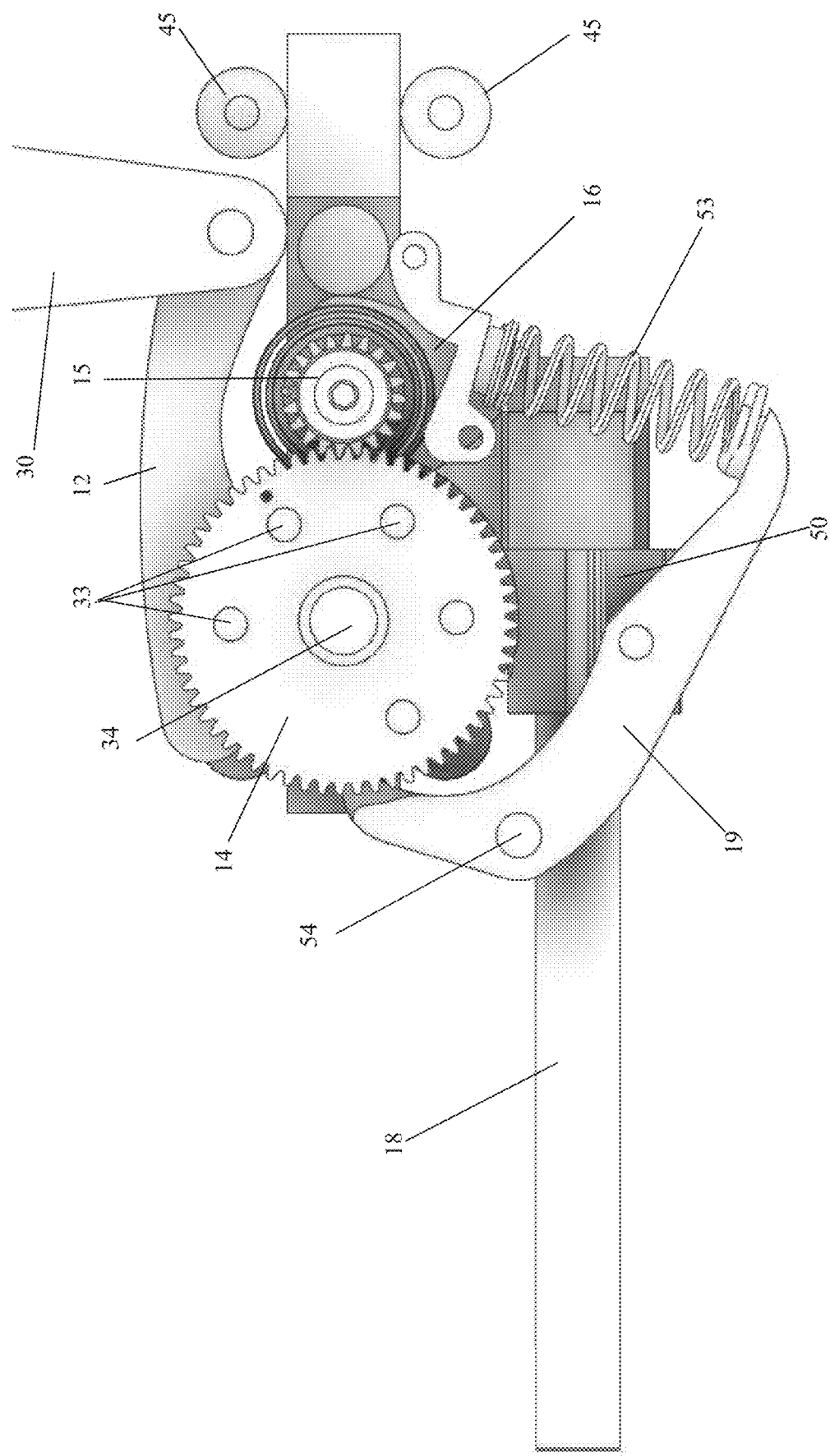
FIG. 9 is a side elevation view of the configuration illustrated in FIG. 6 with a spine plate removed for clarity purposes and in a neutral.
Figure 10:
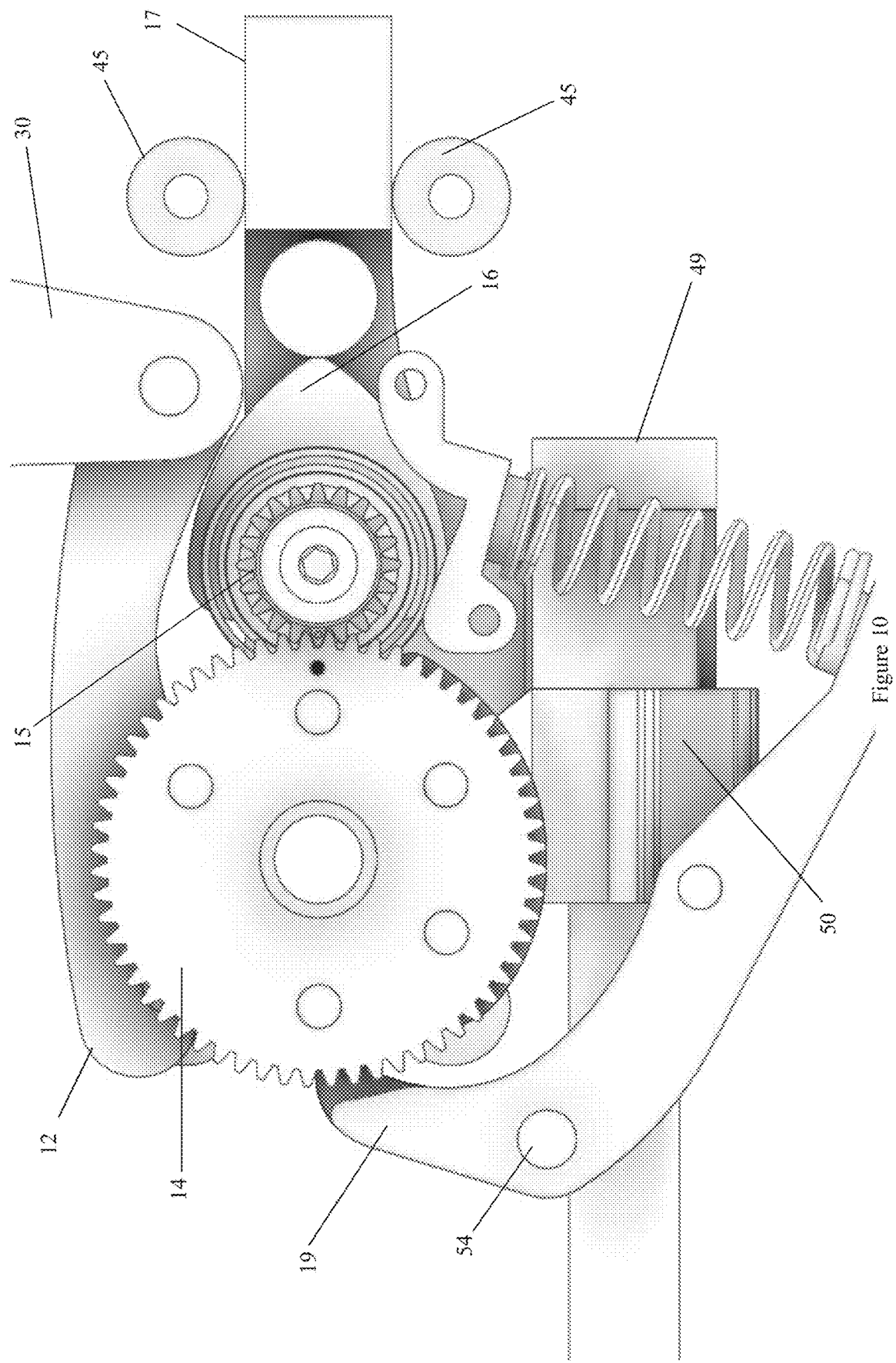
FIG. 10 is a detailed view of the configuration illustrated in FIG. 9 with the reciprocating shifter member in a first position corresponding to a first gear of a H-pattern gearbox.

The second shaped cam 16 as illustrated most clearly in FIG. 8, is a tri-lobed cam which is substantially heart shaped with a pair of lobes 41 at one end thereof and a third lobe 42 at an opposite end of the shaped cam 16. Normally, arcuate transitions are provided between all of the lobes but the arcuate transition between the pair of lobes 41 at one end and the third lobe 42 form arcuate sidewalls 43 which are greater in length than the transition between the pair of lobes 41 at the one end.

The second shaped cam 16 as illustrated abuts a pair of mounts or followers 44 for the reciprocating shifter member 17. The rotation of the second shaped cam 16 moves the reciprocating shifter member 17 forward and backward according to the movement of the first shaped cam 16 which is transmitted through the first 14 and second gears 15. The reciprocating shifter member 17 is moved guided by the mounts or followers 44.

The shifter member 17 may have any shape but is preferably elongate and is mounted on to the mounts or followers 44 for reciprocal movement relative to the spine plate 25. The shifter member 17 as illustrated is approximately perpendicular to the shifting lever 11 and substantially parallel with the connector rods of the gearbox. The shifter member 17 is attached to the shifter rod 18 of the converter assembly. The shifter member 17 is mounted outside the second shaped cam 16, away from the spine plate 25 although normally, a portion of the shifter member 17.

A number of roller guides 45 are provided which guide movement of the shifter member 17 one upper roller guide and one lower roller guide at either end of the shifter member 17. The roller guides 45 are provided on the same side of the spine plate 25 as the second shaped cam 16 and the shifter member 17.

According to the preferred embodiment illustrated in FIG. 5 in particular, the shifter member 17 is substantially F-shaped when viewed in plan with a pair of extensions 46 extending laterally from a substantially planar body located between the roller guides 45 and abutting one side of the spine plate 25. Preferably, the second shaped cam 16 and the mounts or followers 44 for the shifter member 17 are located between the pair of extensions 46.

The elongate shifter rod 18 is mounted for both translation and rotation and is moved transversely (translation) by movement of the reciprocating shifter member 17 and is rotated by movement of the shifter rod rotating arm 19. The shifter rod 17 may be mounted through use of a depending bracket portion from the reciprocating shifter member 17 with a cuff 47 into which a portion of smaller dimension 48 of the shifter rod 18 can be received. This smaller dimension portion 48 is typically be defined by a head 49 and a rotating arm adapter portion 50. The cuff 47 is sandwiched between the head 49 and a rotating arm adapter portion 50 to move the shifter rod 18 with the shifter member 17.

Figure 20:
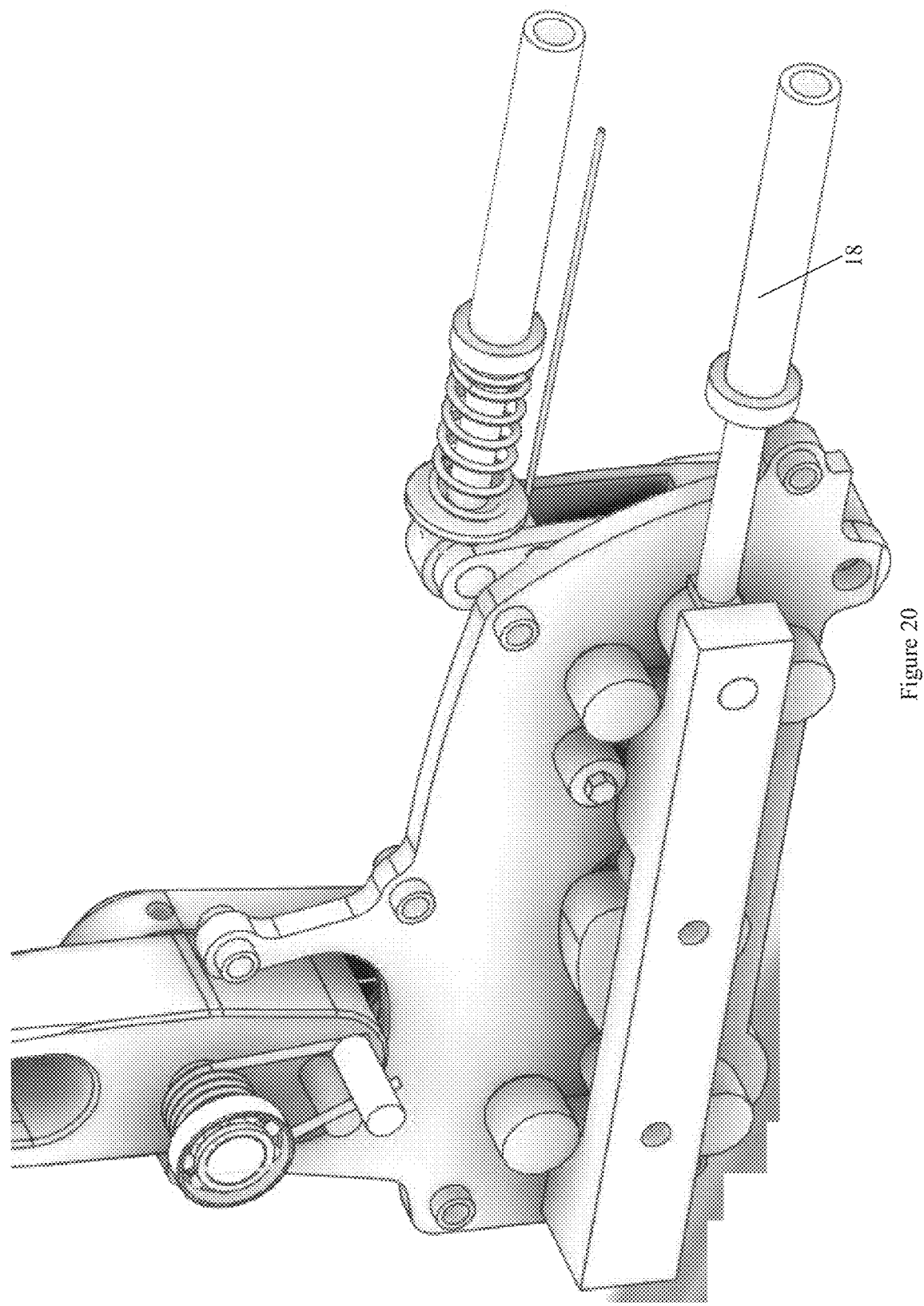
FIG. 20 is a view from the second side of an alternative, cable shift variant of the converter assembly of the present invention.
Figure 21:
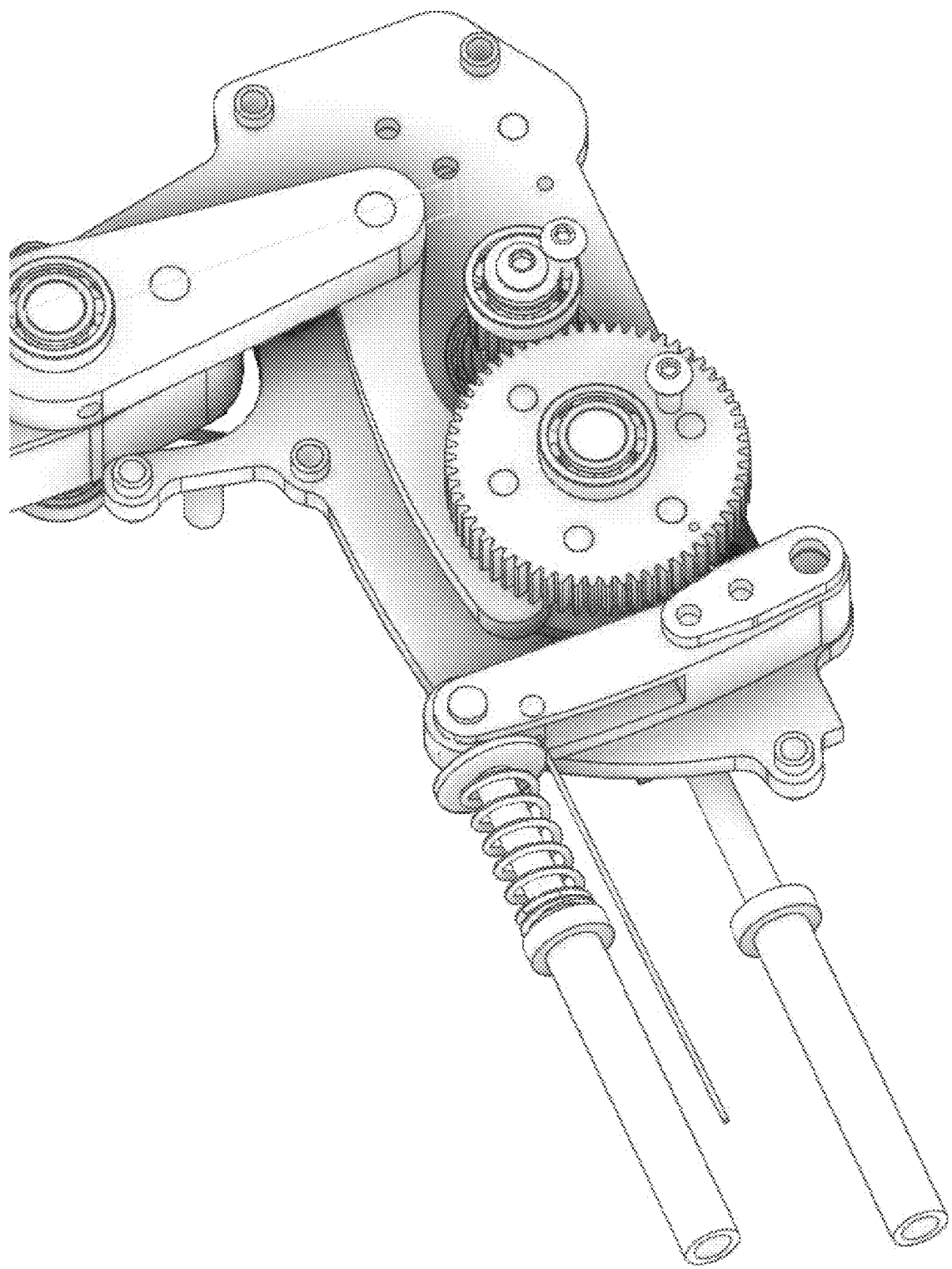
FIG. 21 is a view from the first side of the variant illustrated in FIG. 20.

The shifter rod 18 can be attached to one end of the shifter member 17 for reciprocal movement with the shifter member 17 as illustrated in FIGS. 20 and 21.

Figure 22:
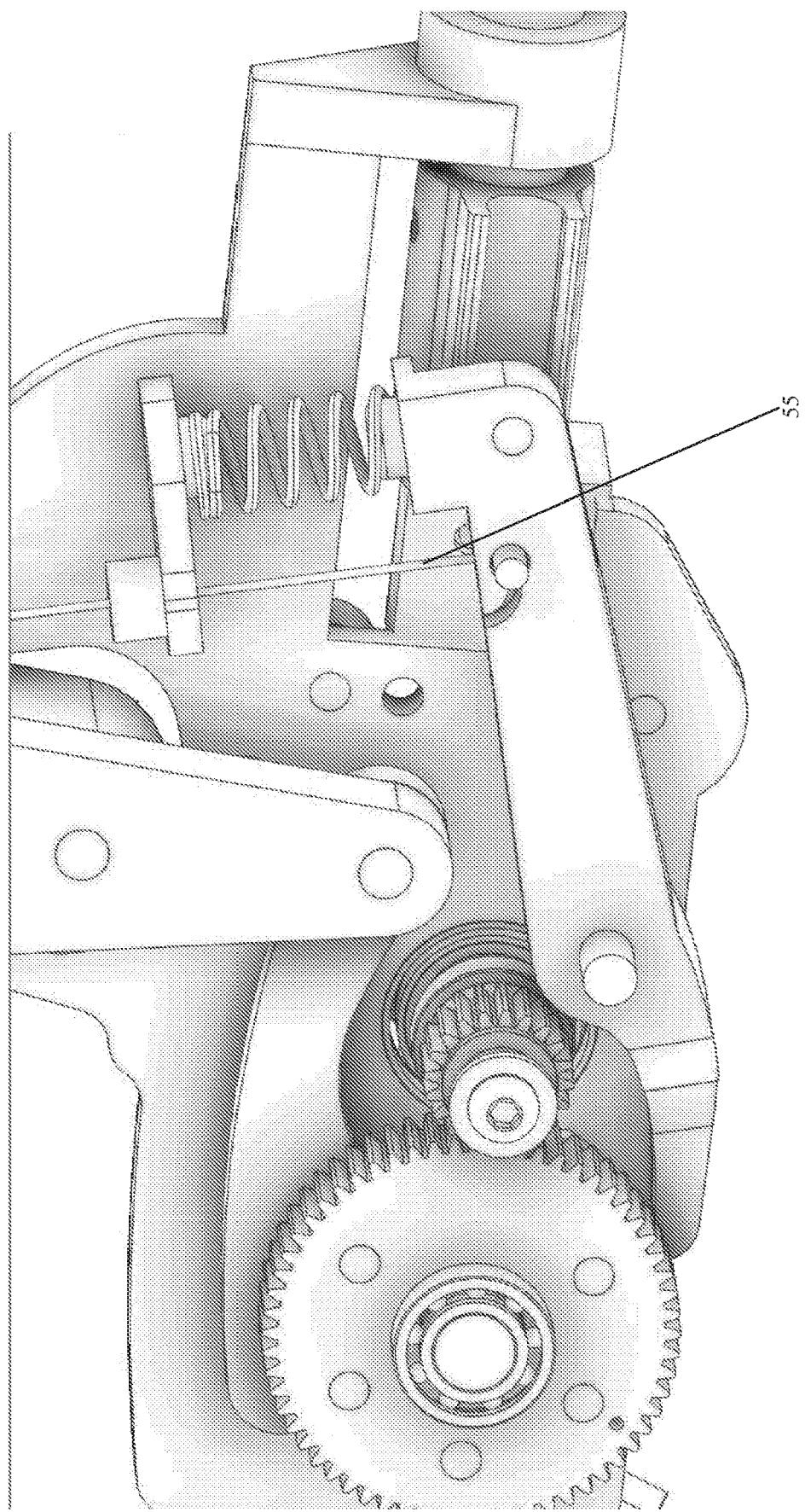
FIG. 22 is a view from the first side an alternative, external shift variant of the converter assembly of the present invention.

FIG. 22 shows a cable 55 release mechanism for moving the shifter rod rotating arm in order to rotate the shifter rod.

Figure 23:
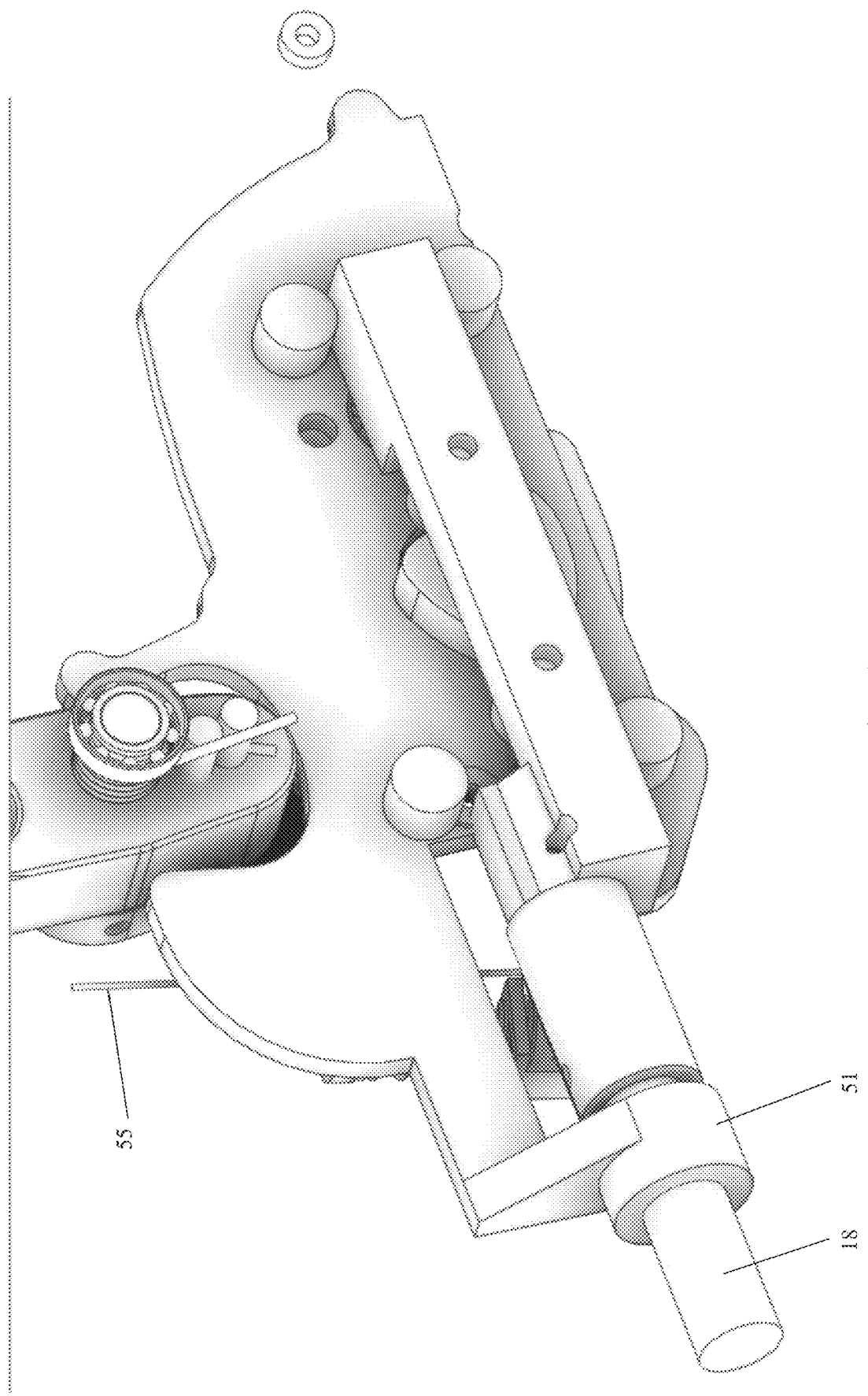
FIG. 23 is a view from the second side of the variant illustrated in FIG. 22.
Figure 24:
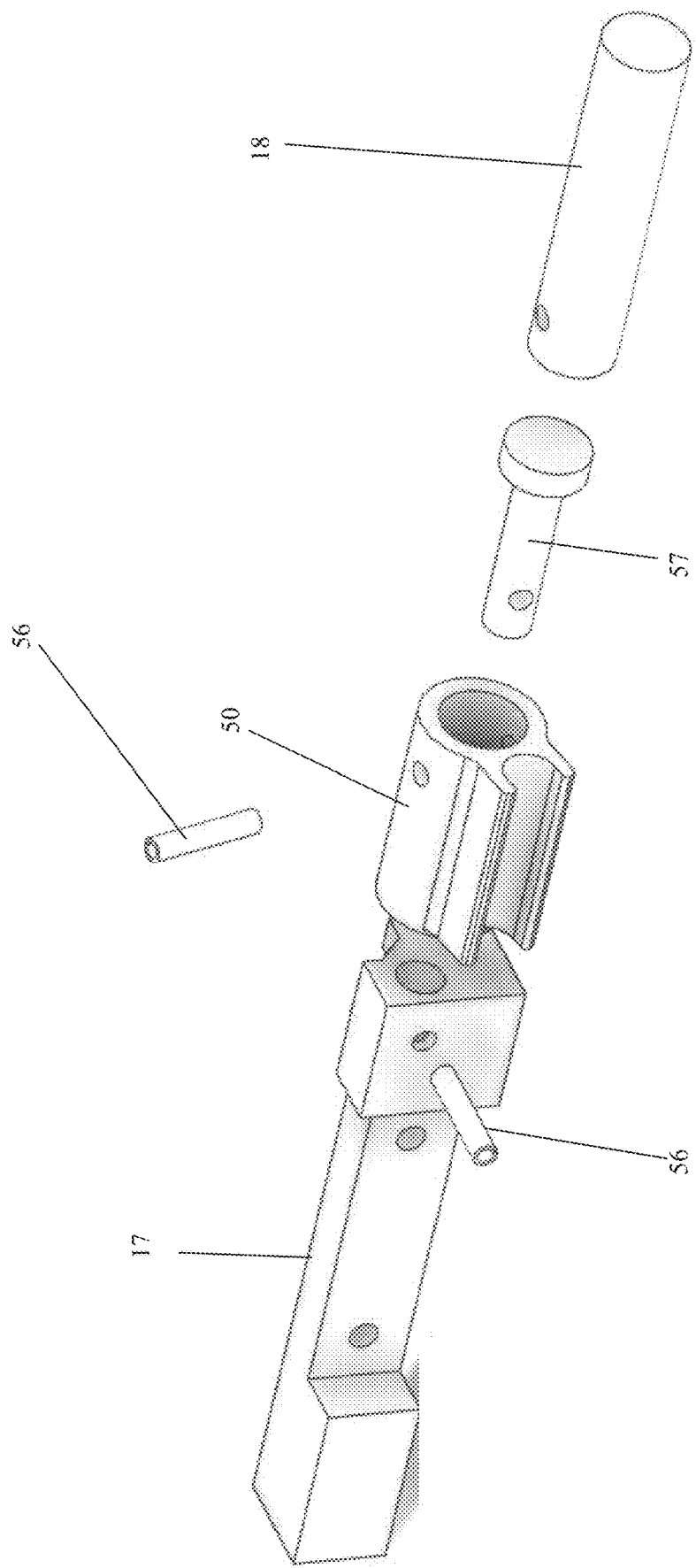
FIG. 24 is a detailed, exploded view of the coupling detail of the variant illustrated in FIG. 26.

The shifter rod can be externally mounted as illustrated in FIG. 23 as well using an adapter assembly as illustrated in FIG. 24 in order to attach the shifter rod 18 relative to the shifter member 17. In this configuration, the spine plate 25 may be provided with a guide 51 mounted thereon in order to guide reciprocal movement of the shifter rod.

The adapter mechanism illustrated in FIG. 24 connects the shifter member 17 with the shifter rod 18. First the rotating arm adapter 50 is attached to the shifter member 17 by insertion of the connector 57 into the bore of the adapter 50 and an attachment pin 56 inserted into the aligned openings. Then the shifter rod 18 is inserted into the bore of the adapter 50 and is fixed relative thereto using an attachment pin 56.

The shifter rod rotating arm 19 has a first end 20 biased into contact with the edge of the first shaped cam 13 and a second portion 52 to rotate the elongate shifter rod 18 when urged to by the shape of the first shaped cam 13 during rotation thereof. A biasing assembly 53 is provided to bias the shifter rod rotating arm 19 into abutment with the edge of the first shaped cam 13. Typically, the shifter rod rotating arm 19 is pivotally mounted relative to spine plate 25 about a pin 54 but is biased into contact with the first shaped cam 13. The protrusions 39 provided on the edge of the first shaped cam 13 preferably force rotation of the shifter rod rotating arm 19 about the mounting pin 54.

The second portion 52 of the shifter rod rotating arm 19 is provided to engage with the adapter 50 provided on the elongate shifter rod 18. The adapter 50 of the illustrated embodiment includes an open cuff which extends laterally from the elongate shifter rod 19. The second portion 52 of the rotating arm 19 has a cylindrical shape which extends laterally to engage with the cuff According to this particularly preferred embodiment, when the rotating arm 19 pivots, the second portion 52 in connection with the elongate shifter rod 18 causes rotation of the shifter rod 18 through engagement of the cuff with the second portion 52. This will force the elongate shifter rod 18 to engage with a different connector rod in the gearbox.

Figure 18:
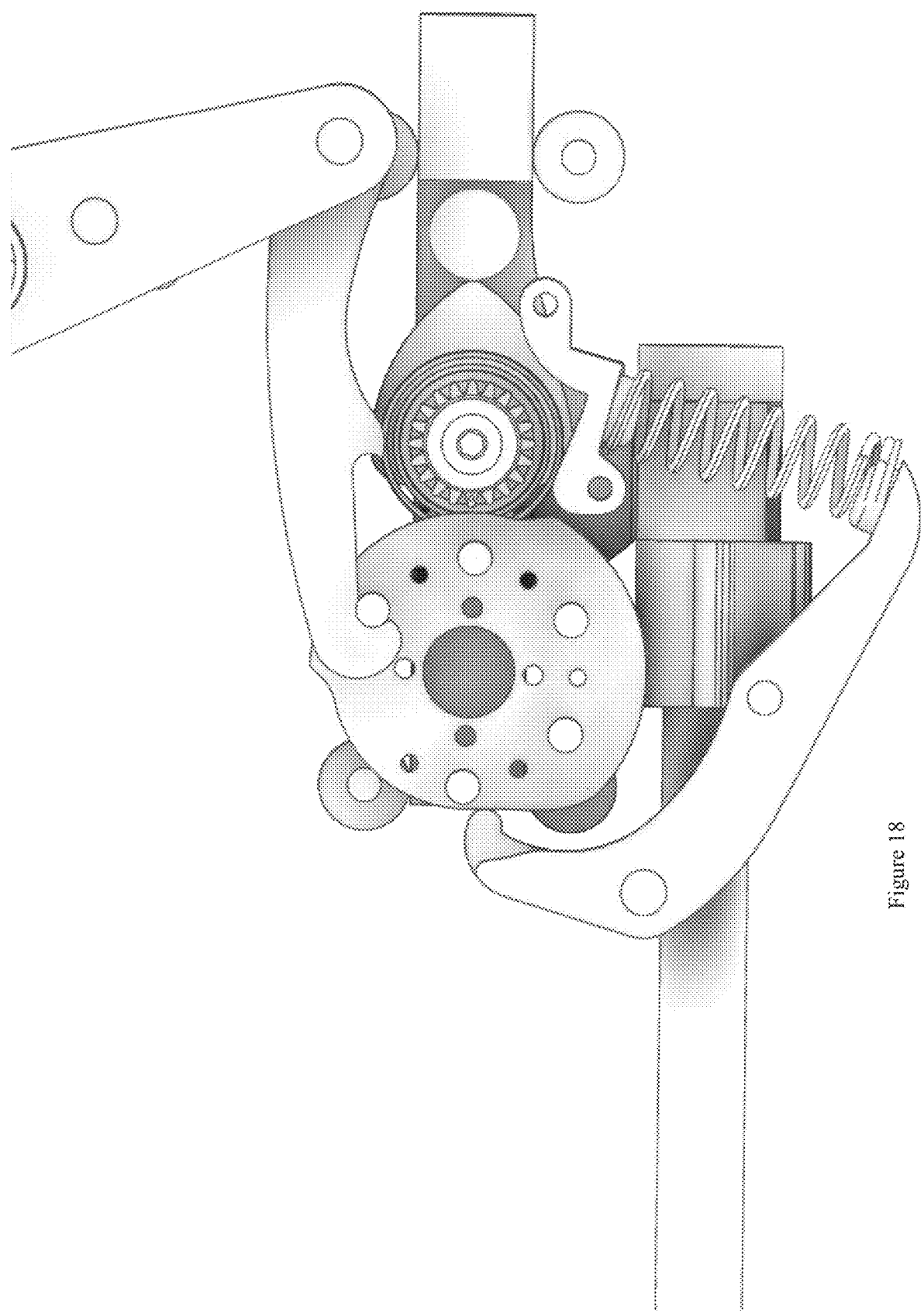
FIG. 18 is a detailed view of the configuration illustrated in FIG. 9 with the downshift just completed.
Figure 19:
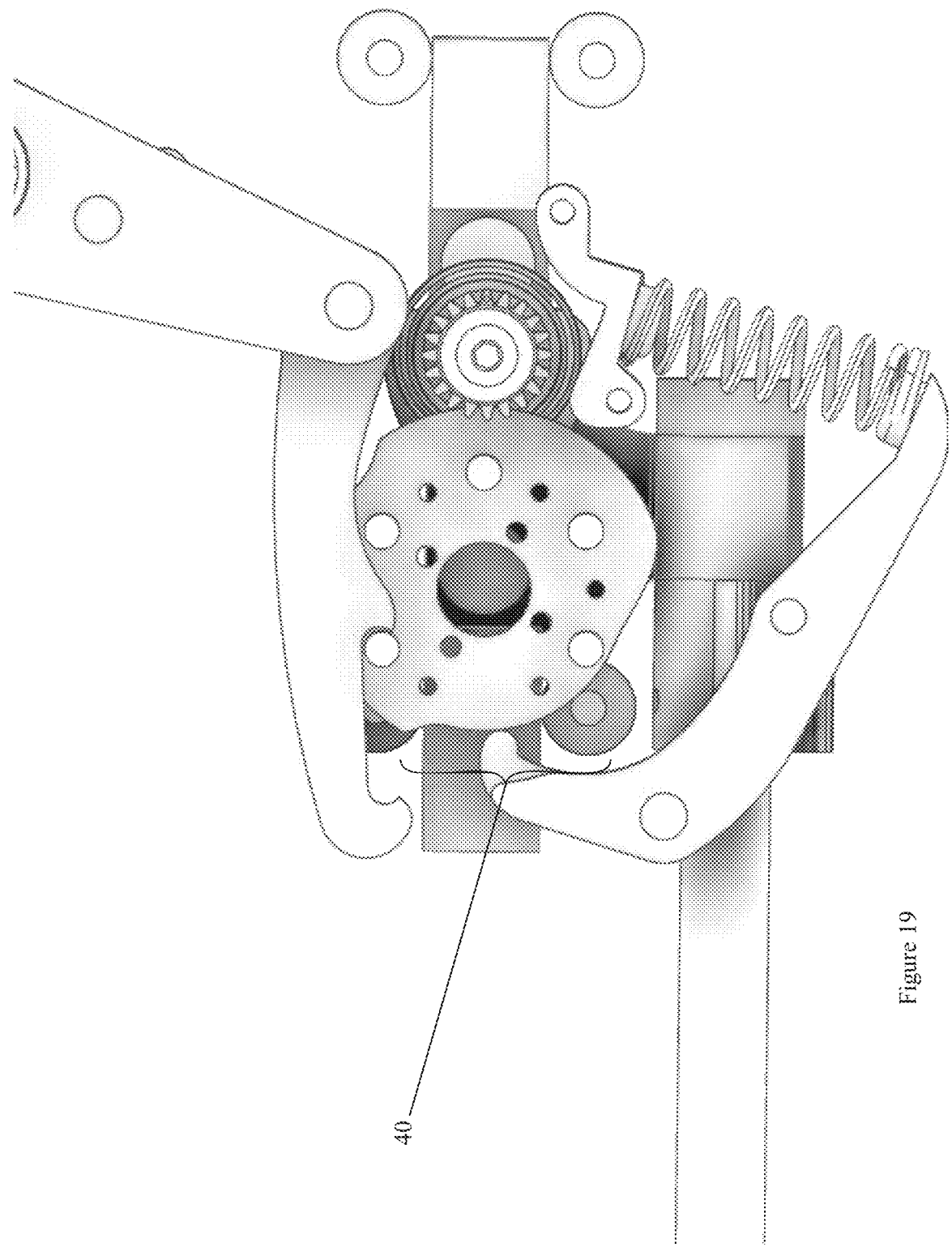
FIG. 19 is a detailed view of the configuration illustrated in FIG. 9 with the upshift just completed.

The different gear selections are illustrated in FIGS. 10 to 17 with the downshift and upshift illustrated in FIGS. 18 and 19 respectively.

Figure 27:
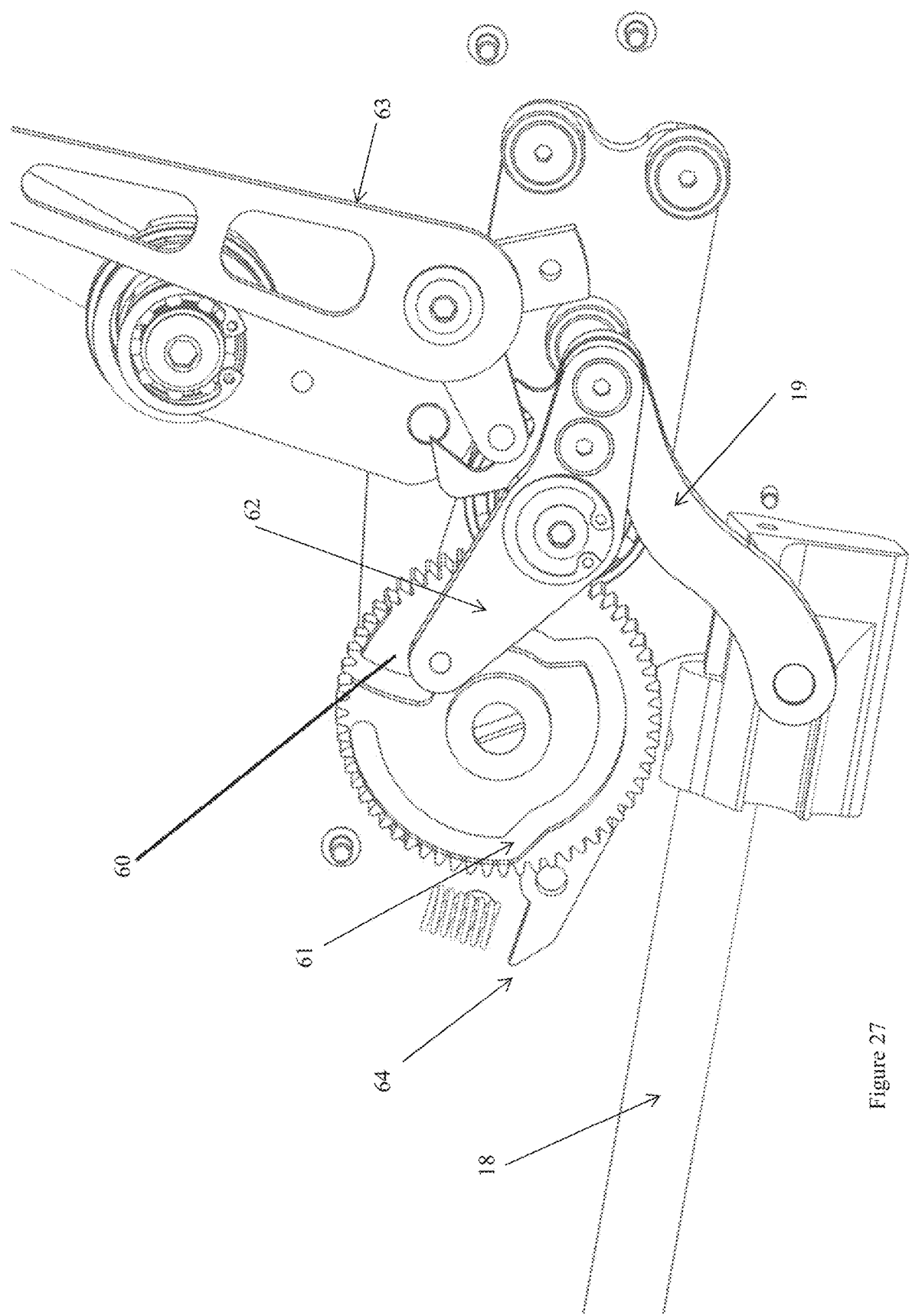
FIG. 27 is an isometric view of an alternative preferred configuration of the sequential shift gearbox converter assembly in which the first cam and first gear are combined into a single component.
Figure 28:
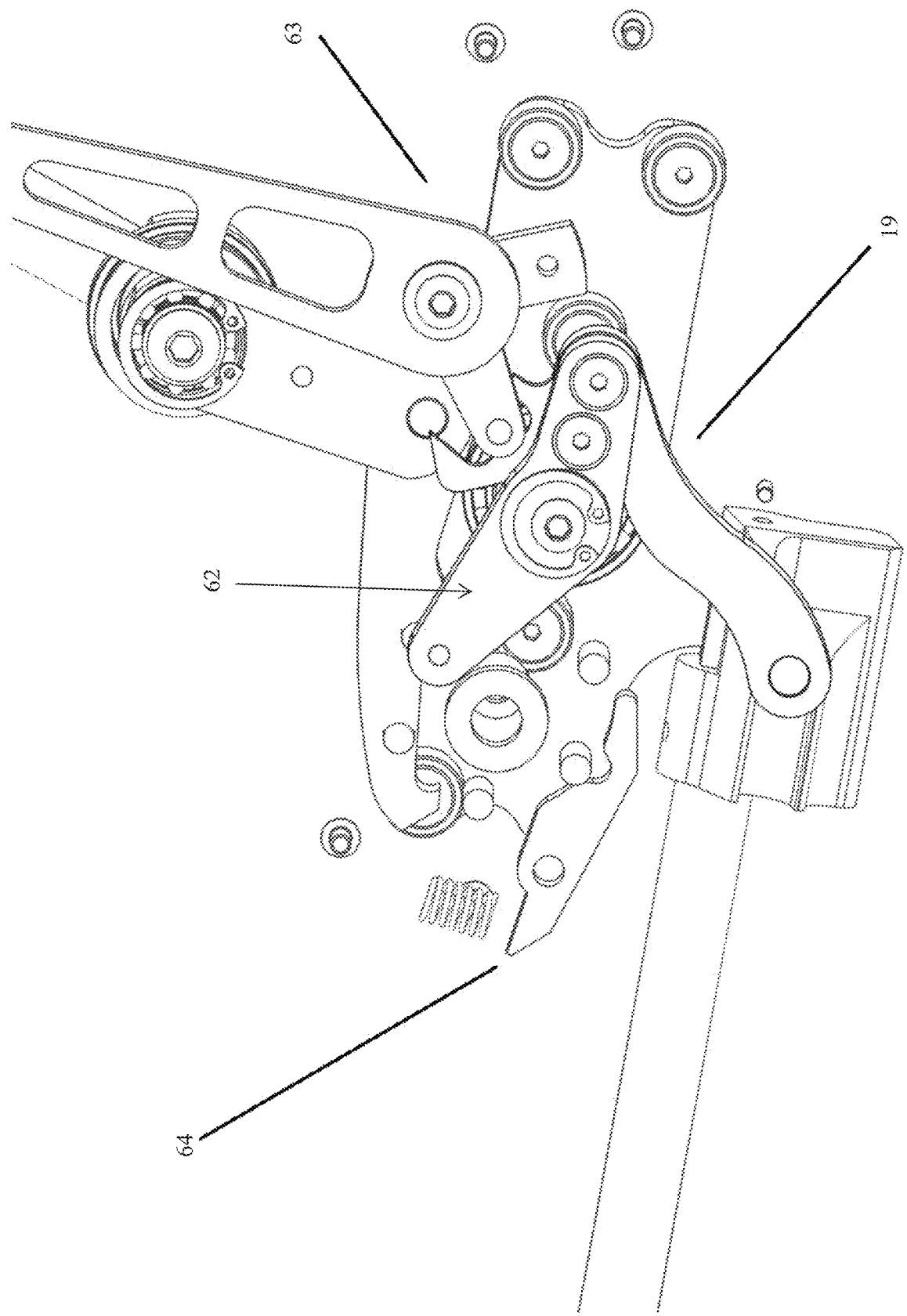
FIG. 28 is an isometric view of the configuration illustrated in FIG. 27 with the combined first cam and first gear removed for clarity purposes.

In the alternative embodiment illustrated in FIGS. 27 and 28, the first gear and first cam are provided as a single component 60. In this embodiment, the first cam is provided as a cam shape inscribed or formed into a surface of the first gear to form a cam track or cam race 61. In this embodiment, the preferred shifter rod rotating arm 19 can be mounted to or relative to a movement arm 62 which is rotatable about the axis of the second gear and which is moved by a secondary selection lever 63. One end of the movement arm 62 has a pin (obscured) that rides in the cam track or cam race 61 of the single component first cam and first gear to cause rotation of the shifter rod 19 as required. This configuration has the advantage of combining two components into one, simplifying the construction and operation of the converter assembly and also eliminating the need for the provision of a spring to tension the shifter rod rotating arm against the first cam.

The secondary selection lever 63 can be used to select reverse by acting more directly on the movement arm 62 as illustrated in FIG. 28. A spring biased ratchet arm 64 is also provided in order to index the rotation of the single cam and gear component 60 through engagement with the engagement portions 33 on the opposite side of the single cam and gear component 60 to the cam track or cam race 61.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

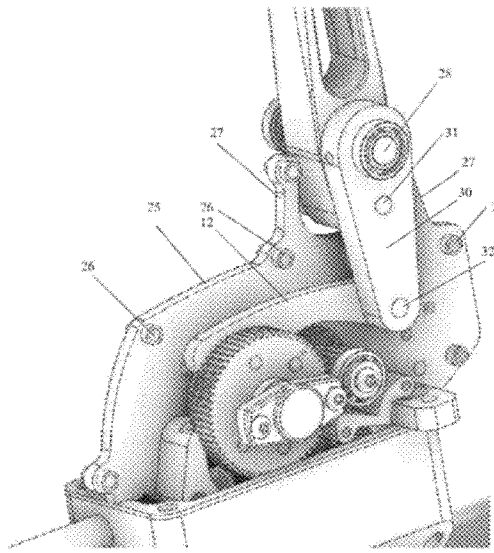

The invention claimed is:

1. A sequential shift gearbox converter assembly to convert a H-pattern gearbox to a sequentially shifted gearbox, the converter assembly including a shifting lever mounted relative to a converter housing, a drive arm mounted for movement driven by the shifting lever, a first shaped cam for rotation driven by the drive arm, a first gear for movement caused by movement of the first shaped cam, a second gear for movement caused by movement of the first gear, a second shaped cam mounted for movement when the second gear is moved, a reciprocating shifter member moved according to movement of the second shaped cam, the reciprocating shifter member moved according to movement of the second shaped cam to in turn move an elongate shifter rod of a gearbox transversely and a shifter rod rotating arm having a first portion biased into contact with the first shaped cam and a second portion to rotate the elongate shifter rod when urged to by the shape of the first cam during rotation thereof.

2. A sequential shift gearbox converter assembly as claimed in claim 1 wherein a pair of housing portions are provided attached to one another about a spine plate relative to which components of the assembly are mounted within the housing.

3. A sequential shift gearbox converter assembly as claimed in claim 1 wherein the gearbox converter assembly is mounted relative to a vehicle gearbox or chassis in which the gear shift lever of an H-pattern gearbox has been removed and shifter rods that link the gearshift of the H pattern gearbox to moving portions of the gearbox remain and the converter assembly of the present invention engages with the existing shifter rods.

4. A sequential shift gearbox converter assembly as claimed in claim 1 wherein the shifting lever is biased into a central position and is movable forwardly and rearwardly against the bias, which returns the shifting lever to a home position.

5. A sequential shift gearbox converter assembly as claimed in claim 1 wherein the shifting lever has a lower end located within the housing and mounted to a connector arm at or towards the lower end of shifting lever to connect the shifting lever to the drive arm of the converter assembly in order to move the drive arm when the shifting lever is moved.

6. A sequential shift gearbox converter assembly as claimed in claim 1 wherein the drive arm moves in a reciprocating direction forwardly and rearwardly, one end of the drive arm connected r relative to the connector arm and an opposite end of the drive arm provided with an engagement configuration thereon in order to drive movement of the first shaped cam.

7. A sequential shift gearbox converter assembly as claimed in claim 1 wherein the drive arm is mounted for movement in both the forward and rearward directions and drives rotational movement of the first shaped cam in both directions about a substantially central mounting axis.

8. A sequential shift gearbox converter assembly as claimed in claim 1 wherein the first shaped cam is substantially planar and is normally mounted parallel to the drive arm and coaxially with the first gear of the converter assembly.

9. A sequential shift gearbox converter assembly as claimed in claim 1 wherein the first shaped cam moves the shifter rod rotating arm when the first portion of the shift rod rotating arm moves over the first shaped cam due to rotation of the first shaped cam.

10. A sequential shift gearbox converter assembly as claimed in claim 1 wherein the first shaped cam has a number of engagement portions provided dependent on the number of gears in the gearbox.

11. A sequential shift gearbox converter assembly as claimed in claim 1 wherein the second shaped cam is a tri-lobed cam.

12. A sequential shift gearbox converter assembly as claimed in claim 11 wherein arcuate transitions are provided between all of the lobes of the second shaped cam but the arcuate transition between a pair of lobes at one end and a third lobe form arcuate sidewalls which are greater in length than the transition between the pair of lobes at the one end.

13. A sequential shift gearbox converter assembly as claimed in claim 1 wherein the first gear and first cam are provided as a single component.

14. A sequential shift gearbox converter assembly as claimed in claim 13 wherein a cam shape is inscribed into a surface of the first gear to form a cam track or cam race.

15. A sequential shift gearbox converter assembly as claimed in claim 13 wherein the shifter rod rotating arm is mounted relative to a movement arm which is rotatable about an axis of the second gear and which is moved by a secondary selection lever, one end of the movement arm having a pin that rides in the cam track or cam race to cause rotation of the shifter rod as required.

* * * * *

UNITED STATES PATENT AND TRADEMARK OFFICE
CERTIFICATE OF CORRECTION

PATENT NO. : 10,550,932 B2
APPLICATION NO. : 15/303211
DATED : February 4, 2020
INVENTOR(S) : Simon Christopher Cunliffe It is certified that error appears in the above-identified patent and that said Letters Patent is hereby corrected as shown below:

On the Title Page

Under ABSTRACT "15 Claims, 28 Drawing Sheets" should read:
12 Claims, 28 Drawing Sheets as shown on the attached page In the Claims Column 16, Line 35, Claim 1, "a H-pattern" should be --an H-pattern--

Column 18, Line 17, Claim 13, should be deleted

Column 18, Line 20, Claim 14, should be deleted

Column 18, Line 23, Claim 15, should be deleted

Signed and Sealed this
Twelfth Day of July, 2022

Katherine Kelly Vidal
*Director of the United States Patent and Trademark Office*

(12) United States Patent
Cunliffe

(10) Patent No.: US 10,550,932 B2
(45) Date of Patent: Feb. 4, 2020

(54) SEQUENTIAL SHIFT GEARBOX CONVERTER ASSEMBLY

(71) Applicant: Simon Christopher Cunliffe, Brisbane (AU)

(72) Inventor: Simon Christopher Cunliffe, Brisbane (AU)

(*) Notice: Subject to any disclaimer, the term of this patent is extended or adjusted under 35 U.S.C. 154(b) by 362 days.

(21) Appl. No.: 15/303,211

(22) PCT Filed: Apr. 9, 2015

(86) PCT No.: PCT/AU2015/050160
§ 371 (c)(1),
(2) Date: Oct. 10, 2016

(87) PCT Pub. No.: WO2015/154145
PCT Pub. Date: Oct. 15, 2015

(65) Prior Publication Data
US 2017/0030459 A1    Feb. 2, 2017

(30) Foreign Application Priority Data
Apr. 9, 2014  (AU) .................. 2014901303

(51) Int. Cl.
*F16H 59/04*   (2006.01)
*F16H 61/26*   (2006.01)
*F16H 59/02*   (2006.01)

(52) U.S. Cl.
CPC ............. *F16H 59/04* (2013.01); *F16H 61/26* (2013.01); *F16H 2059/026* (2013.01); *F16H 2059/0295* (2013.01); *F16H 2059/047* (2013.01)

(58) Field of Classification Search
CPC .................. F16H 2061/242; F16H 2059/0239
See application file for complete search history.

(56) References Cited

U.S. PATENT DOCUMENTS 3,636,793 A * 1/1972 Bieber ................. B60K 20/02
                                                    74/473.1
4,028,959 A * 6/1977 Long ..................... F16H 59/04
                                                    74/473.23
(Continued)

*Primary Examiner* — William Kelleher
*Assistant Examiner* — Gregory T Prather
(74) *Attorney, Agent, or Firm* — Lane Powell PC

(57) ABSTRACT

A sequential shift gearbox converter assembly to convert a H-pattern gearbox to a sequentially shifted gearbox, the converter assembly including a shifting lever mounted relative to a converter housing, a drive arm mounted for movement driven by the shifting lever, a first shaped cam for rotation driven by the drive arm, a first gear for movement caused by movement of the first shaped cam, a second gear for movement caused by movement of the first gear, a second shaped cam mounted for movement when the second gear is moved, a reciprocating shifter member moved according to movement of the second shaped cam, a reciprocating shifter member moved according to movement of the second shaped cam to in turn move an elongate shifter rod of a gearbox transversely and a shifter rod rotating arm having a first portion biased into contact with the first shaped cam and a second portion to rotate the elongate shifter rod when urged to by the shape of the first cam during rotation thereof.

12 Claims, 28 Drawing Sheets